(12) United States Patent
Shiraiwa

(10) Patent No.: US 8,472,067 B2
(45) Date of Patent: Jun. 25, 2013

(54) IMAGE OUTPUT CONTROL APPARATUS

(75) Inventor: Yoshinobu Shiraiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 952 days.

(21) Appl. No.: 11/683,875

(22) Filed: Mar. 8, 2007

(65) Prior Publication Data

US 2007/0146792 A1    Jun. 28, 2007

Related U.S. Application Data

(62) Division of application No. 11/082,641, filed on Mar. 18, 2005, which is a division of application No. 10/046,480, filed on Jan. 16, 2002, now Pat. No. 7,218,422, which is a division of application No. 09/062,552, filed on Apr. 20, 1998, now Pat. No. 7,057,751.

(30) Foreign Application Priority Data

Apr. 23, 1997 (JP) .................................... 9-106076
Mar. 9, 1998 (JP) .................................. 10-056620

(51) Int. Cl.
*G06F 3/12* (2006.01)
*G06K 15/00* (2006.01)
*G06K 9/60* (2006.01)

(52) U.S. Cl.
USPC ............ 358/1.18; 358/1.1; 358/1.9; 358/1.15; 358/1.16; 358/1.17; 382/305; 348/96; 348/207.1; 348/207.2; 348/207.99; 348/211.2; 348/211.3; 348/231.99; 348/231.2; 348/231.3; 348/231.9

(58) Field of Classification Search
USPC .......... 358/906, 1.1, 1.9, 1.15–1.18; 382/305; 348/96, 207.1, 207.2, 207.99, 211.2, 211.3, 348/231.99, 231.2, 231.3, 231.9
See application file for complete search history.

(56) References Cited

U.S. PATENT DOCUMENTS

| | | | |
|---|---|---|---|
| 4,574,319 A | | 3/1986 | Konishi |
| 4,655,577 A | | 4/1987 | Ikuta |
| 4,768,099 A | | 8/1988 | Mukai |
| 4,802,018 A | * | 1/1989 | Tanikawa et al. .............. 386/118 |
| 4,935,809 A | * | 6/1990 | Hayashi et al. ............... 358/527 |
| 5,046,167 A | | 9/1991 | Nakano et al. |
| 5,073,868 A | | 12/1991 | Tada |
| 5,164,831 A | * | 11/1992 | Kuchta et al. ............... 348/231.7 |
| 5,251,074 A | * | 10/1993 | Hamma et al. ................ 386/343 |
| 5,258,880 A | | 11/1993 | Takahashi |
| 5,339,134 A | | 8/1994 | Nakamura et al. |
| 5,339,137 A | | 8/1994 | Kusumoto |

(Continued)

FOREIGN PATENT DOCUMENTS

| | | |
|---|---|---|
| EP | 0698993 A2 | 2/1996 |
| EP | 1229723 A3 | 5/2003 |

(Continued)

*Primary Examiner* — King Poon
*Assistant Examiner* — Beniyam Menberu
(74) *Attorney, Agent, or Firm* — Fitzpatrick, Cella, Harper & Scinto

(57) ABSTRACT

An image output control apparatus includes a recognition unit for recognizing mounting of a recording medium, a reading unit for reading image-reproduction instruction data recorded in the recording medium based on the recognition of the mounting, and a generation unit for performing image generation for output by selectively reading necessary image data from the information recording medium in accordance with the image-reproduction instruction data.

8 Claims, 30 Drawing Sheets

U.S. PATENT DOCUMENTS

| | | | |
|---|---|---|---|
| 5,572,499 A | 11/1996 | Kohtani et al. | |
| 5,633,678 A | 5/1997 | Parulski et al. | |
| 5,666,211 A | 9/1997 | Tahara et al. | |
| 5,678,046 A | 10/1997 | Cahill et al. | |
| 5,740,335 A | 4/1998 | Takayanagi et al. | |
| 5,754,307 A | 5/1998 | Miura | |
| 5,764,368 A | 6/1998 | Shibaki et al. | |
| 5,784,149 A | 7/1998 | Kawaoka | |
| 5,828,461 A * | 10/1998 | Kubo et al. | 358/296 |
| 5,861,957 A | 1/1999 | Nagata | |
| 5,862,297 A | 1/1999 | Timmermans | |
| 5,898,824 A | 4/1999 | Kato et al. | |
| 5,901,278 A | 5/1999 | Kurihara et al. | |
| 6,094,217 A * | 7/2000 | Nishimura | 348/96 |
| 6,111,659 A | 8/2000 | Murata | |
| 6,147,703 A * | 11/2000 | Miller et al. | 348/220.1 |
| 6,177,956 B1 | 1/2001 | Anderson et al. | |
| 6,191,811 B1 * | 2/2001 | Nishimura et al. | 348/96 |
| 6,243,171 B1 | 6/2001 | Haneda | |
| 6,249,316 B1 | 6/2001 | Anderson | |
| 6,331,903 B1 * | 12/2001 | Nakazawa et al. | 358/487 |
| 6,342,900 B1 * | 1/2002 | Ejima et al. | 345/698 |
| 6,498,658 B1 * | 12/2002 | Sekikawa | 358/1.16 |
| 6,573,927 B2 * | 6/2003 | Parulski et al. | 348/32 |
| 6,603,506 B2 | 8/2003 | Ogawa et al. | |
| 6,724,502 B1 * | 4/2004 | Miyake et al. | 358/474 |
| 6,867,879 B1 | 3/2005 | Sasaki et al. | |
| 6,937,356 B1 | 8/2005 | Ito et al. | |
| 7,057,751 B1 * | 6/2006 | Shiraiwa | 358/1.15 |
| 7,218,422 B2 * | 5/2007 | Shiraiwa | 358/404 |
| 8,274,676 B2 * | 9/2012 | Shiraiwa | 358/1.15 |
| 2001/0033732 A1 * | 10/2001 | Juen et al. | 386/15 |
| 2005/0146746 A1 | 7/2005 | Parulski et al. | |

FOREIGN PATENT DOCUMENTS

| | | | |
|---|---|---|---|
| GB | 2 286 944 | | 8/1995 |
| JP | 01-072348 | | 3/1989 |
| JP | 64-072674 | | 3/1989 |
| JP | 07-038693 | * | 2/1995 |
| JP | 07-311457 | * | 11/1995 |
| JP | 8-214248 | | 8/1996 |
| JP | 08-321909 | | 12/1996 |
| JP | 09-043736 | * | 2/1997 |
| JP | 09-093376 | | 4/1997 |
| JP | 10-334212 | | 12/1998 |
| KR | 0119115 | | 7/1997 |

\* cited by examiner

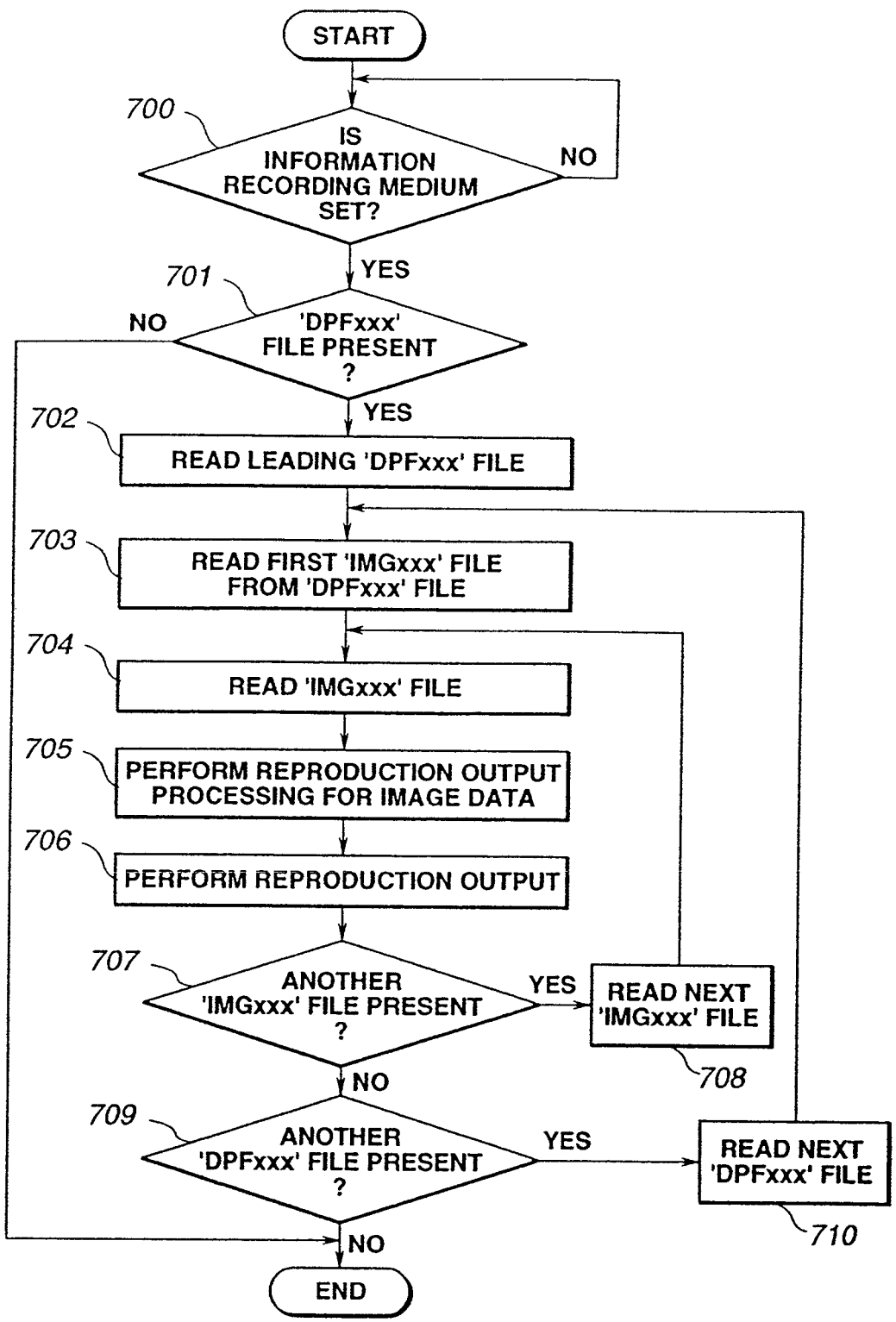

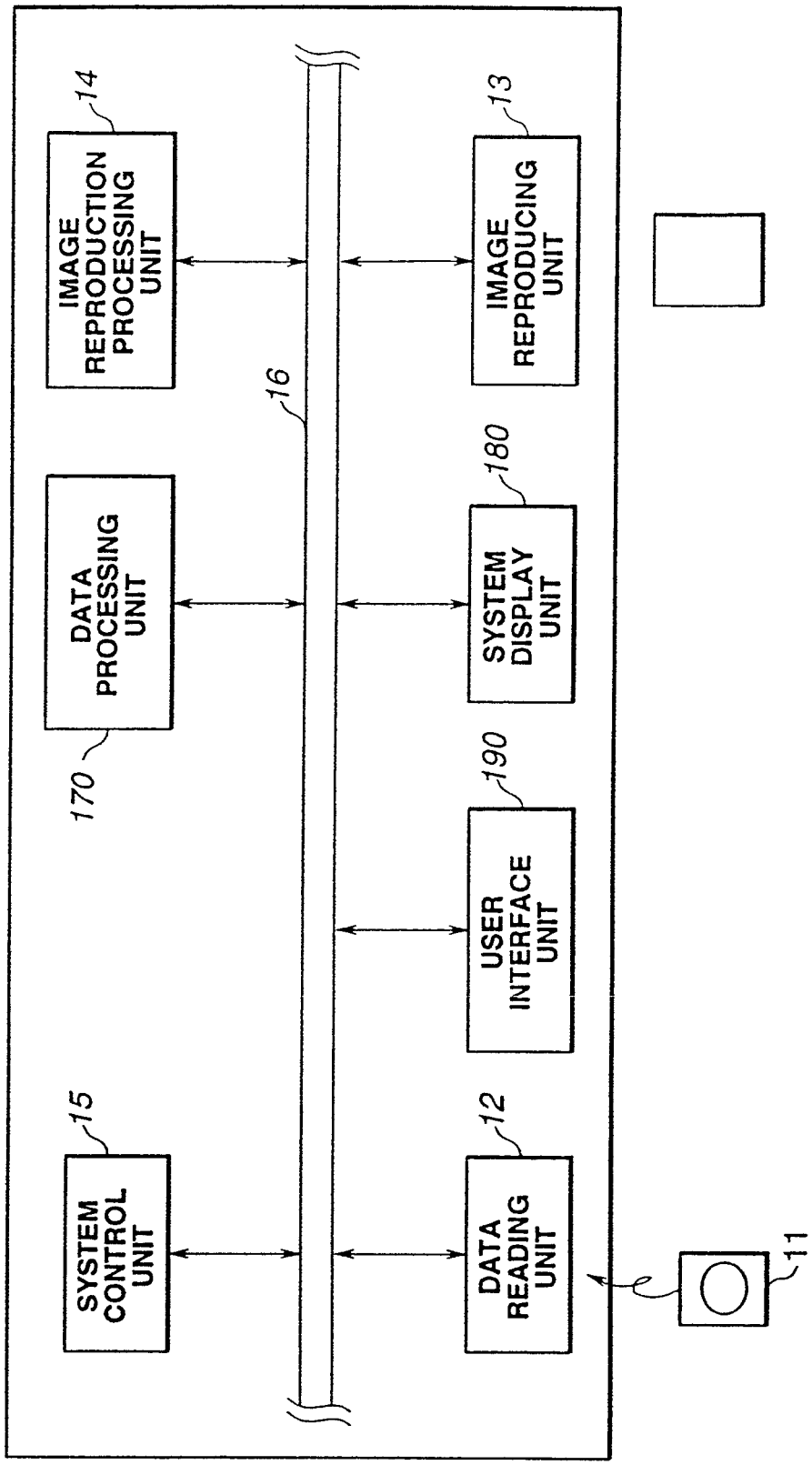

FIG.18

```
<PRE>
CIFF_VERSION=1.0
<IMG SRC=" A00.JPG">
CIFF_PRINT_COUNT=2
<IMG SRC=" A03.JPG">
```

IMAGE OUTPUT CONTROL APPARATUS

This application is a divisional of U.S. patent application Ser. No. 11/082,641, filed Mar. 18, 2005, which is a divisional of U.S. patent application Ser. No. 10/046,480, filed on Jan. 16, 2002, which is a divisional of U.S. patent application Ser. No. 09/062,552, filed Apr. 20, 1998, now U.S. Pat. No. 7,057,751, issued Jun. 6, 2006, the contents of all of which are incorporated by reference herein.

BACKGROUND OF THE INVENTION

1. Field of the Invention

The present invention relates to an image output control method and apparatus which can obtain a desired reproduced image using image data recorded in an information storage medium, such as a floppy disk, a card memory or the like, and which can edit data of the information recording medium, to a recording medium recording an image data file, and to a recording medium storing an image output control program.

2. Description of the Related Art

There is an extra-print service of photographs as a conventional general method for reproducing image data possessed by the customer. In the extra-print service of photographs, the customer brings in a semitransparent negative cover (negative holder) having a developed film accommodated thereon to a development laboratory or the like by writing the number of extra prints of each image, or marks. The development laboratory provides extra prints of a desired image to be reproduced (printed) by specifying the image. Recently, a photo CD (compact disk) system in which an image on a film is read, read image data is written in a CD-ROM (read-only memory), and the image data is read from the CD-ROM and is reproduced/displayed on an image display device is being utilized. In the photo CD system, a computer system reads image data recorded in a CD-ROM, and outputs the read image data using a high-picture-quality printer to provide a print image. Since the high-picture-quality printer is too expensive to be possessed by the customer, a print image is generally obtained by asking a development laboratory or the like to perform a print service. When asking a print service, the customer generally gives a CD-ROM, and a memo containing information for specifying image data recorded in the CD-ROM (such as the number of the corresponding image confirmed on an index print or the like).

In accordance with improvement in the computer technology, diffusion of personal computers, and diffusion of image input devices, such as digital cameras and the like, the user can easily deal with high-definition digital image data. Such image data is recorded in a predetermined information recording medium in one of various kinds of image filing formats, such as TIFF, PICT, JPEG (Joint Photographic Experts Group), RAW and the like, and is usually output from a printer connected to a computer owned by the user. However, the printer owned by the user cannot, in some cases, provide a satisfactory print. In order to solve such a problem, a print service which can output/reproduce image data recorded in an information recording medium in the above-described manner using a high-performance printer is available at a development lavoratory, a photo studio, a DPE shop or a personal-computer shop. In order to obtain such a service, the customer must ask a print-service shop to provide prints by giving image data. Recently, it is possible to ask for prints by transmitting image data via a communication network. However, a print service is usually performed by providing a print-service shop with an information recording medium where image data is recorded.

When the customer asks a print service of image data recorded in an information recording medium in the above-described manner, the customer must assign a desired image from among image data recorded in the information recording medium. For that purpose, the customer must provide a print-service shop with a memo or the like describing the number or the name of the image. The print service shop must provide a print of the image by selecting the desired image from among the image data recorded in the information recording medium based on the number or the name of the image described in the memo or the like by performing a manual operation.

In general, a computer system for performing the above-described print service requires a complicated operation. Accordingly, it is not easy for an ordinary shop worker to provide a print by selecting an image to be printed. In addition, since it is necessary to select a desired image from among image data recorded in an information recording medium, a manpower is required for providing a print, thereby increasing a time period for providing the print.

SUMMARY OF THE INVENTION

It is an object of the present invention to solve the above-described problems.

It is another object of the present invention to provide an image filing method and an image reproducing method in which a print of a desired image can be promptly obtained by automatically specifying the image from among images recorded in an information recording medium.

In an improvement of the invention, there is the problem that, since image reproduction is performed by automatically selecting image data to be reproduced using image-reproduction instruction data recorded in an information recording medium, the image to be reproduced cannot be confirmed before reproducing the image without providing some means.

In an example of such means, the image-reproduction instruction data recorded in the information recording medium is checked using an apparatus capable of accessing the information recording medium. However, this method is troublesome because exchange of the information recording medium is required.

Another problem is that, when the total number of prints reproduced/output in accordance with image-reproduction instruction data exceeds the number outputtable in the system or the apparatus, print output cannot be performed in the midst of an image reproducing operation, thereby generating a system error or the like.

In another improvement of the invention, an information-recording-medium-data editing method in which image data is recorded or erased, or image-reproduction instruction data is provided or deleted in an information recording medium by accessing it can be considered. A system including an image input device, a personal computer and the like as well as an information-recording-medium-data editing unit which adopts this editing method can also be considered. In this case, it is possible to record new image data or delete image data which becomes unnecessary in the information recording medium, so that the capacity and the like of the information recording medium can be effectively utilized.

However, when editing data in the information recording medium, a reproduction error may be produced when reproducing an image unless attention is paid to processing of recording/deleting image data and processing of instructing (selecting/not selecting) image data to be reproduced. For example, when image data recorded in the information recording medium and instructed to be reproduced in accordance with image-reproduction instruction data is deleted from the image recording medium because of some reason, and processing of disabling image-reproduction instruction data for the deleted data is not performed, image data instructed to be reproduced is not actually present in the information recording medium, and an image reproducing operation is terminated as an error. This indicates that the image reproducing operation is terminated in a state of abnormality when automatically performing image reproduction, resulting in a fatal operational error.

The present invention provides techniques having the following features.

In an image filing method for recording image data in an information recording medium, the image data and image-reproduction instruction data instructing whether or not the image data is to be reproduced are recorded in the information recording medium.

A method for reproducing image data recorded in an information recording medium includes data reading means for reading recorded data, such as image data, image-reproduction instruction data and the like, recorded in the information recording medium, means for selectively reading the image-reproduction instruction data from among the recorded data, reproduction-output-data generation processing means for reading necessary image data from the information recording medium in accordance with the image-reproduction instruction data and for outputting reproduction output data for reproduction, and reproducing means for reproducing the reproduction output data.

According to the image filing method and the image reproducing method of the present invention, image data, and image-reproduction instruction data instructing whether or not the image data is to be reproduced are recorded in the information recording medium. The image-reproduction instruction data is selectively read from the recorded data recorded in the information recording medium, necessary image data is selectively read from the information recording medium in accordance with the read image-reproduction instruction data, and processing of generating reproduction output data is performed to reproduce desired image data.

According to one aspect, the present invention which achieves these objectives relates to a memory medium for storing image data and image-reproduction instruction data for instructing whether or not the image data is to be reproduced so that the image-reproduction instruction data specifies an image for which image reproduction is instructed, and that the specified image data can be selectively output based on the image-reproduction instruction data.

According to another aspect, the present invention which achieves these objectives relates to an image output control method including a function of recognizing mounting of a recording medium, a reading function of reading image-reproduction instruction data recorded in the recording medium based on the recognition of the mounting, and a generation function of performing image generation for output by selectively reading necessary image data from the information recording medium in accordance with the image-reproduction instruction data.

According to still another aspect, the present invention which achieves these objectives relates to an image output control apparatus including recognition means for recognizing mounting of a recording medium, reading means for reading image-reproduction instruction data recorded in the recording medium based on the recognition of the mounting, and generation means for performing image generation for output by selectively reading necessary image data from the information recording medium in accordance with the image-reproduction instruction data.

According to yet another aspect, the present invention which achieves these objectives relates to an output control method including a determination function of determining mounting of a medium, a discrimination function of discriminating whether or not an image output program is stored in the medium when the determination function has determined that the medium is mounted, and a control function of controlling output so as to selectively output an image to be output in accordance with the image output program when the discrimination function has discriminated that the image output program is stored.

According to yet a further aspect, the present invention which achieves these objectives relates to an output control apparatus including determination means for determining mounting of a medium, discrimination means for discriminating whether or not an image output program is stored in the medium when the determination means has determined that the medium is mounted, and control means for controlling output so as to selectively output an image to be output in accordance with the image output program when the discrimination means has discriminated that the image output program is stored. The control means may have a function of determining whether or not image-reproduction instruction data is stored in the medium. If the result of the determination is affirmative, the control means controls output so as to selectively output image data instructed by the image-reproduction instruction data. The apparatus may further include control means for controlling output of the image to be output in accordance with an output program incorporated within the apparatus when the discrimination means has discriminated that the image output program is not stored in the medium. The control means may include a function of determining whether or not image-reproduction instruction data is stored in the medium. When the result of the determination is affirmative, the control means controls output so as to selectively output image data instructed by the image-reproduction instruction data based on the output program incorporated within the apparatus.

According to still another aspect, the present invention which achieves these objectives relates to an output control method including a determination function of determining whether or not a medium storing an image output program is set, and a control function of controlling output so as to selectively output an image to be output in accordance with the image output program if the result of the determination is affirmative.

According to still another aspect, the present invention which achieves these objectives relates to an output control apparatus including determination means for determining whether or not a medium storing an image output program is set, and control means for controlling output so as to selectively output an image to be output in accordance with the image output program if the result of the determination is affirmative.

According to still another aspect, the present invention which achieves these objectives relates to a memory medium including a function of recognizing mounting of a recording medium, a reading function of reading image-reproduction instruction data recorded in the recording medium based on the recognition of the mounting, and a generation function of performing image generation for output by selectively reading necessary image data from the information recording medium in accordance with the image-reproduction instruction data.

According to still another aspect, the present invention which achieves these objectives relates to a memory medium including a determination function of determining mounting of a medium, a discrimination function of discriminating whether or not an image output program is stored in the medium when the determination function has determined that the medium is mounted, and a control function of controlling output so as to selectively output an image to be output in accordance with the image output program when the discrimination function has discriminated that the image output program is stored.

According to still another aspect, the present invention which achieves these objectives relates to a memory medium including a determination function of determining whether or not a medium storing an image output program is set, and a control function of controlling output so as to selectively output an image to be output in accordance with the image output program if the result of the determination by the determination function is affirmative.

According to still another aspect, the present invention which achieves these objectives relates to an image output control apparatus including recognition means for recognizing mounting of a recording medium which stores image data and image-reproduction instruction data for instructing whether or not the image data is to be reproduced so that the image-reproduction instruction data specifies an image for which image reproduction is instructed, and that the specified image data can be selectively output based on the image-reproduction instruction data, reading means for reading the image-reproduction instruction data recorded in the recording medium based on the recognition of the mounting of the recording medium by the recognition means, and generation means for performing image generation for output by selectively reading necessary image data from the information recording medium in accordance with the image-reproduction instruction data.

According to still another aspect, the present invention which achieves these objectives relates to an image output control apparatus including recognition means for recognizing reception of image data and image-reproduction instruction data in a format so that the image data can be selectively output in an output device based on the image-reproduction instruction data, reading control means for reading the image-reproduction instruction data based on the recognition of reception of the image data and the image-reproduction instruction data by the recognition means, and generation control means for selectively performing image generation for output for necessary image data from among the image data in accordance with the image-reproduction instruction data.

According to still another aspect, the present invention which achieves these objectives relates to an image output control apparatus including data reading means for reading recorded data including image data and image-output instruction data recorded in an information recording medium, output-data generation processing means for outputting output data for output by reading necessary image data from the information recording medium in accordance with the image-output instruction data, output means for outputting the output data, data display means for displaying image-output instruction data relating image output, and data processing means for analyzing the image-output instruction data.

According to still another aspect, the present invention which achieves these objectives relates to an image output control apparatus including data reading means for reading recorded data including image data and image-output instruction data recorded in an information recording medium, output-data generation means for outputting output data for output by reading necessary image data from the information recording medium in accordance with the image-output instruction data, output means for outputting the output data, data display means for displaying data relating to image output, data processing means for analyzing the image-output instruction data, and means for recognizing a number of prints currently outputtable by the apparatus.

According to still another aspect, the present invention which achieves these objectives relates to an image output control apparatus including means for accessing an information recording medium, data reading means for reading recorded data including image data and image-output instruction data recorded in the information recording medium, and determination means for determining whether or not data to instruct erasure of image data in the recorded data is present. If the determination means has determined that the erasure instruction data is present, image-output instruction data corresponding to that image data is erased based on the erasure instruction data.

According to still another aspect, the present invention which achieves these objectives relates to an image output control apparatus including reading means for reading image-reproduction instruction data for instructing whether or not image data is to be reproduced recorded in an information recording medium storing the image data and the image-reproduction instruction data so that the image-reproduction instruction data specifies an image for which image reproduction is instructed, and that the specified image data can be selectively output based on the image-reproduction instruction data, generation means for performing image reproduction for output by reading necessary image data from the information recording medium in accordance with the read image-reproduction instruction data, and skip means for skipping an operation of outputting an image corresponding to image data for which the image-reproduction instruction data is provided when that image data is absent in the information recording medium.

According to still another aspect, the present invention which achieves these objectives relates to an image input control apparatus including input control means for inputting image data, and recording control means for recording image data corresponding to image-reproduction instruction data for instructing whether or not image data is to be reproduced, based on a format provided so that image-reproduction instruction data specifies image data for which image reproduction is instructed.

The foregoing and other objects, advantages and features of the present invention will become more apparent from the following description of the preferred embodiments taken in conjunction with the accompanying drawings.

BRIEF DESCRIPTION OF THE DRAWINGS

FIG. 7 is a flowchart illustrating the operation of an image reproduction system according to the third embodiment;

FIG. 16 is a diagram illustrating an image reproduction system (apparatus) for performing image reproduction according to a sixth embodiment of the present invention;

FIG. 18 illustrates an example of the contents of recording of a file named 'AUTOPRINT.MRK', serving as a recorded-image file in the information recording medium in the sixth embodiment;

DESCRIPTION OF THE PREFERRED EMBODIMENTS

Image filing methods and image reproducing methods according to preferred embodiments of the present invention will now be described in detail with reference to the drawings.
Provision of Image-reproduction Instruction Data within Each Image Data FIGS. 1(a)-1(c) illustrate a format of filing images in an information recording medium according to a first embodiment of the present invention.

Figure 1A:
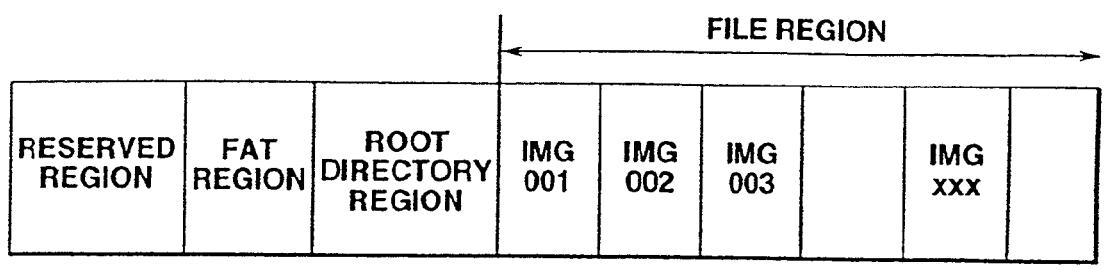
FIGS. 1(a)-1(c) are diagrams illustrating a format of filing recorded images in an information recording medium according to a first embodiment of the present invention.

In the first embodiment, as shown in FIG. 1(a), the information recording medium is mapped into four independent areas, i.e., a reserved region, a file allocation table region, a root directory region, and a file region. In the reserved region, the number of entries within a root directory, the size of the reserved region, and the size of a file allocation table (FAT) in the information recording medium are recorded.

In the file allocation table, the state of use of an information recording medium space in the file region of the information recording medium is recorded. In the root directory, directory-entry information indicating information relating to the name, the size, the position and the like of each file recorded in the information recording medium. In the file region, actual image data and image-reproduction instruction data are recorded.

Figure 1B:
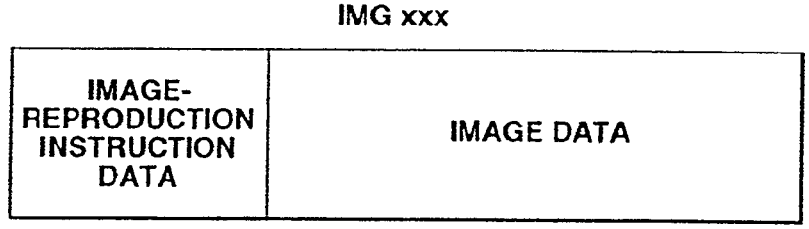
Figure 1C:
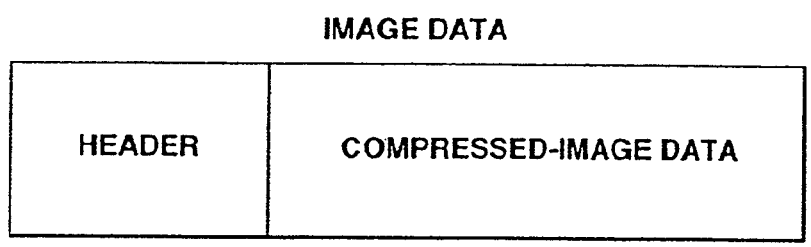

In the first embodiment, as shown in FIG. 1(b), image-reproduction instruction data and image data are recorded in the same file. For the convenience of explanation, this file is named "IMGxxx". Different characters, numerals or the like are allocated in 'xxx' in order to discriminate a plurality of images. In the first embodiment, image-reproduction instruction data is recorded in the head of the file followed by image data. Image data is recorded in the format of JPEG data. In the JPEG format, original image data is recorded by being compressed. As shown in FIG. 1(c), information for restoring the compressed image data into the original image data is recorded as header information constituting a part of the image data. The header information includes, for example, information relating to the size of the image.

Figure 2:
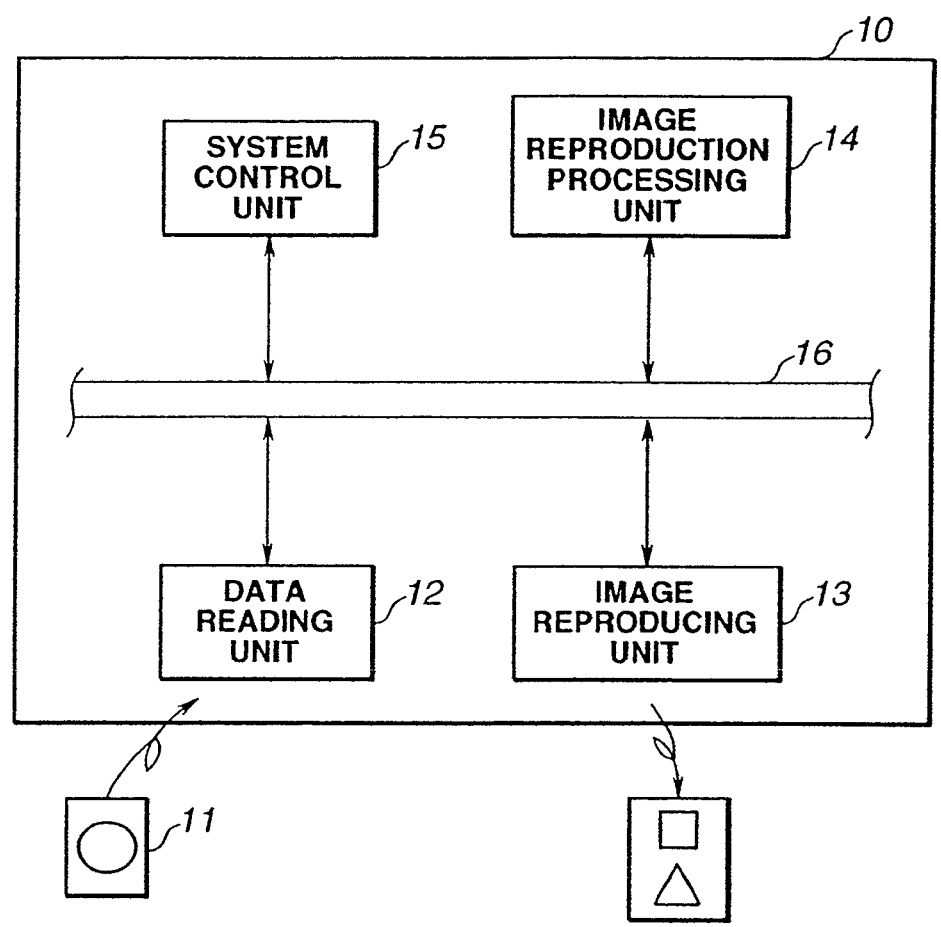
FIG. 2 is a diagram illustrating an image reproduction system (apparatus) for performing image reproduction in the first embodiment.

FIG. 2 illustrates an image reproduction system (apparatus) 10 which executes an image reproduction method according to the first embodiment.

The image reproduction apparatus (system) 10 automatically selects desired image data from among image data recorded in an information recording medium 11, and performs reproduction output (printing) of an image represented by the selected image data. In the first embodiment, a CF (compact flash-memory card) is used as the information recording medium 11. The information recording medium 11 is not limited to the CF. For example, a floppy disk, a CD-R (CD-recordable), a DVD (digital video disk) or the like may also be used. The image reproduction system (apparatus) 10 includes a data reading unit 12 for reading recorded data, comprising image-reproduction instruction data and image data, recorded in the information recording medium 11, and outputting the recorded data to a bus 16, a system control unit 15 for controlling the operations of the entire system by controlling respective units of the image reproduction system 10, an image reproduction processing unit 14 for receiving image data read by the data reading unit 12 under the control of the system control unit 15 and output to the bus 16, and converting the image data into reproduction output data for performing reproduction output and outputting the reproduction output data, and an image reproducing unit 13 for receiving the reproduction output data to perform reproduction output (printing). The system control unit 15 includes, of course, a CPU (central processing unit), a ROM, a RAM (random access memory) and the like.

Figure 3:
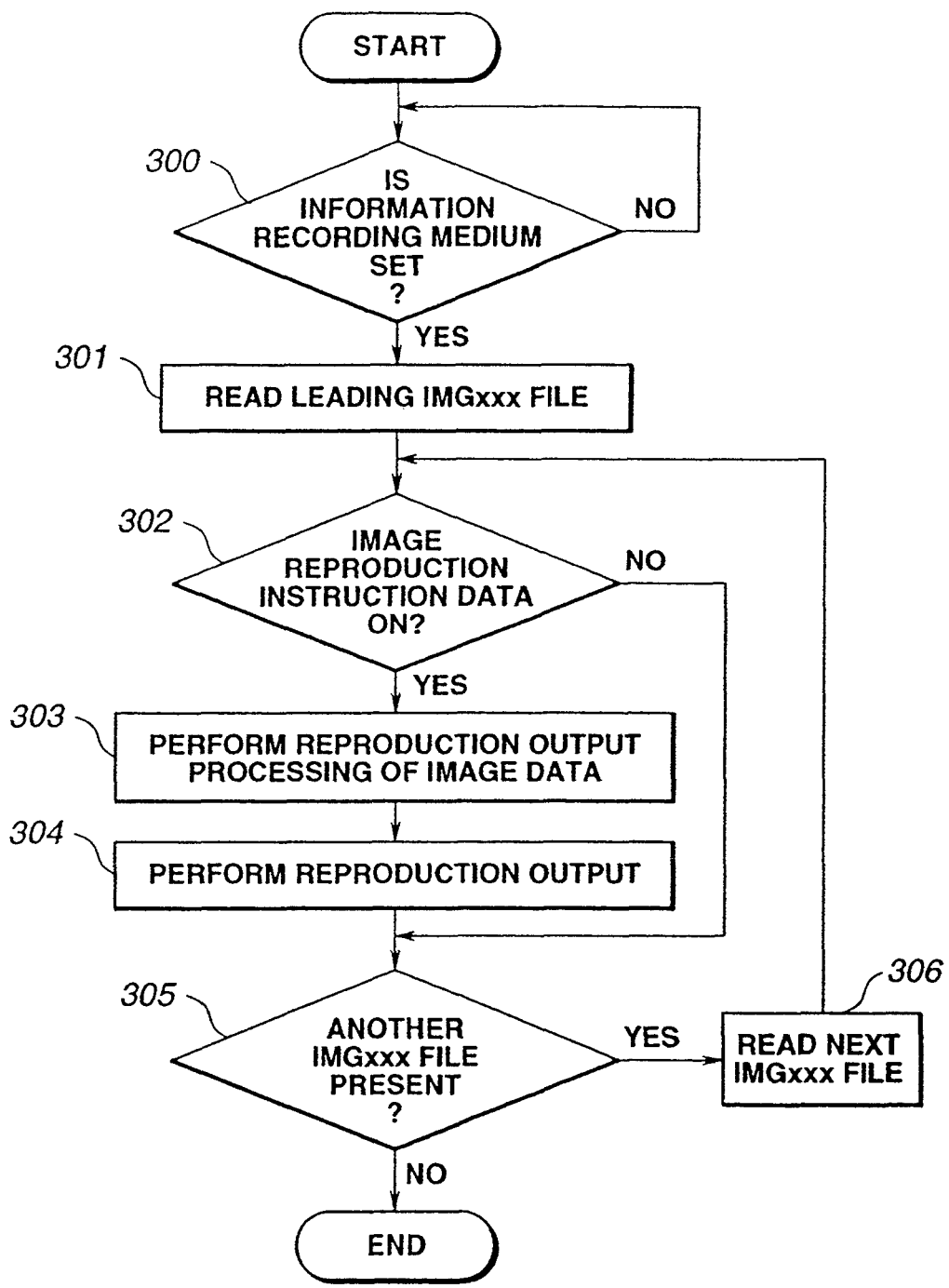
FIG. 3 is a flowchart illustrating the operation of the image reproduction system of the first embodiment.

Next, a description will be provided of the image reproduction system (apparatus) 10 of the first embodiment. FIG. 3 is a flowchart illustrating the operation of the image reproduction system 10. A program represented by the flowchart is set in the RAM, a hard disk or the like of the system control unit 15 of the image reproduction system 10.

When the image reproduction system 10 has started to operate, for example, by turning on the power supply, the operational flow is read and executed.

First, in step 300, it is determined if the information recording medium 11 is set in the data reading unit 12. If the result of the determination in step 300 is affirmative, the process proceeds to step 301, where the leading IMGxxx file from among files recorded in the information recording medium 11 shown in FIGS. 1(*a*)-1(*c*) is read by the data reading unit 12. Then, in step 302, it is determined if image-reproduction instruction data recorded in the read IMGxxx file is in an on-state. In the first embodiment, the image-reproduction instruction data is allocated to the leading 1 byte of the IMGxxx file. If the value of the image-reproduction instruction data equals 1 in decimal notation, that indicates an on-state, and other values indicate an off-state.

At the input side, this data is assigned using input means, such as a personal computer, a digital camera or the like. This data is recorded while determining necessity of reproduction during a photographing operation. The recorded data is read, and is added to an image to be reproduced while confirming necessity of reproduction. Although in the first embodiment, control at the recording side is mainly described, input means for recording an image in a recording medium, such as a digital camera, in a format described in the first embodiment also constitutes, of course, the present invention. In such a case, input control of an image, control of recording recording/reproduction instruction data input corresponding to the input image in a recording medium in the format described in the first embodiment, and control of also recording a corresponding recording control program in the recording medium are also performed.

Accordingly, by analizing the leading 1-byte data of the IMGxxx file, the state of the image-reproduction instruction data can be easily confirmed. When the image-reproduction instruction data is in an off-state (not in an on-state), the process proceeds to steps 305 and 306. When another IMGxxx file is present, the process returns to step 302. When the image-reproduction instruction data is in an on-state, the process proceeds to step 303, where, as described above, the image reproduction processing unit 14 performs image reproduction output processing for image reproduction output (printing) for image data stored in the IMGxxx file to generate image reproduction output data. In step 304, the generated image reproduction output data is reproduced and output by the image reproduction unit 13.

In the first embodiment, JPEG data is used as image data, and the image reproduction unit 13 uses an ink-jet printer as an image reproducing device. Accordingly, the image reproduction processing unit 14 performs processing of obtaining RGB data by defrosting image data stored as JPEG data, color processing, resolution conversion processing, halftoning processing, and the like. Since each of such processing is well known, further description thereof will be omitted. Then, in step 305, it is determined if the next IMGxxx file is present by accessing the information recording medium 11. If the result of the determination in step 305 is affirmative, the process proceeds to step 306, where the next IMGxxx file is read, and the process then returns to step 302. If the result of the determination in step 305 is negative, the operation of the image reproduction system of the first embodiment is terminated.

As described above, in the image reproduction system of the first embodiment, desired image data is automatically selected from the information recording medium where the data is recorded according to the image filing method of the first embodiment, and image reproduction output is performed. Accordingly, as described in the first embodiment, by executing the image filing method and the image reproducing method of the present invention, desired image data recorded in the information recording medium can be automatically reproduced and output without assigning the desired image using a memo or the like.

Although in the first embodiment, JPEG data is used as image data, image data is not limited to JPEG data. For example, data conforming to TIFF, PICT or the like may also be used. RAW data may also be used. In this case, however, it is necessary to record information relating to image reproduction in the information recording medium together with image data. When using data having a format other than the JPEG format, it is only necessary to change processing performed by the image reproduction processing unit 14 shown in the first embodiment depending on each image data. The present invention is not limited to a specific type of image data being used.

Although in the first embodiment, an ink-jet printer is used as the image reproducing device, the present invention is not limited to such a printer. For example, a sublimation-type thermal printer or a silver-halide-film printer may be used. Alternatively, a soft copy display device, such as a CRT (cathode-ray tube), an LCD (liquid-crystal display), a plasma display or the like, may be used. When using such a device, also, it is only necessary to change processing in the image reproduction processing unit 14 shown in the first embodiment so as to perform processing corresponding to a printer or a soft copy display device being used. Accordingly, the present invention may use any appropriate image reproducing device. In the first embodiment, image-reproduction instruction data is recorded in the leading 1-byte region of the file where the image-reproduction instruction data and image data are recorded, and the image-reproduction instruction data is in an on-state when the value of the image-reproduction instruction data equals 1 in decimal notation, and is in an off-state in other cases. However, the present invention is not limited to such an approach. For example, image-reproduction instruction data may be recorded in the leading 2-byte region of the file, or in the last 1-byte region of the file. In the case of image data having an image header, such as JPEG image data, a partial region of the image header is opened for extension by the user. In such a case, image-reproduction instruction data may be recorded using a part of the extended region.

Image-reproduction instruction data is not necessarily in an on-state when its value equal 1, and in an off-state in other cases, as in the first embodiment. Although the position, the size and the contents of recorded image-reproduction instruction data in the file may be arbitrary as described above, it is determined whether or not image data included within the file is to be reproduced by determining how the contents of the image-reproduction instruction data correspond to predetermined contents of recording by analyzing recorded data at a corresponding position based on the position and the size of the recorded image-reproduction instruction data in the file.

Accordingly, it is only necessary to record image data and image-reproduction instruction data instructing whether or not the image data is to be reproduced, so that the position, the size, the contents and the order of recording of recorded image-reproduction instruction data may be arbitrarily set.

Figure 4A:
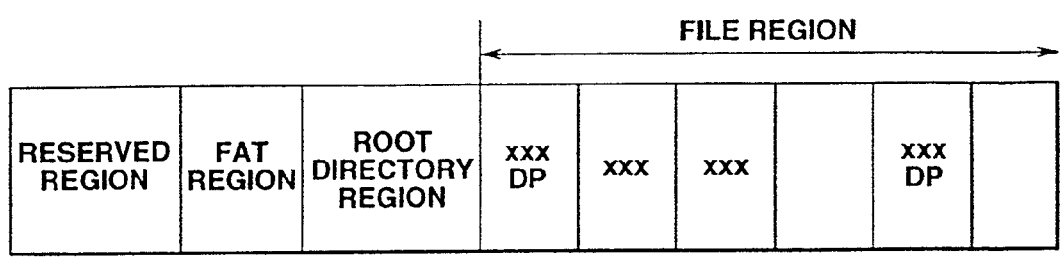
FIGS. 4(a) and 4(b) are diagrams illustrating a format of filing recorded images in an information recording medium according to a second embodiment of the present invention.
Figure 4B:
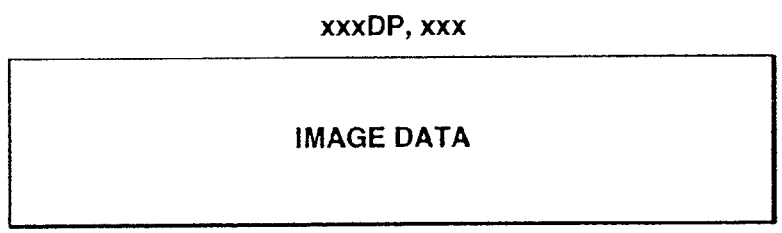

Second Embodiment: Provision of a Particular Mark for the Name of a Recorded File In FIG. 1(b) illustrating the first embodiment, image data and image-reproduction instruction data for instructing whether or not the image data is to be reproduced are recorded in a recording file. However, there is a method of executing the present invention by providing a particular mark for the name of a recording file. FIGS. 4(a) and 4(b) are diagrams illustrating a format of filing images in an information recording medium according to a second embodiment of the present invention. In the second embodiment, also, as shown in FIG. 4(a), the information recording medium is mapped into four independent areas, i.e., a reserved region, a file allocation table region, a root directory region, and a file region. The second embodiment differs from the first embodiment in that a file name recorded in a root directory has information as image-reproduction instruction data. In the second embodiment, 'DP' is added to the name of image data to be subjected to image reproduction.

That is, if the file name is 'xxxDP', it indicates that an image represented by image data corresponding to that file name is to be reproduced. If the file name is only 'xxx', it indicates that an image represented by image data corresponding to that file name is not to be reproduced. An extender in the name may be used as a specific identifier in order to discriminate between an image to be reproduced and an image not to be reproduced.

The image reproduction system 10 for performing image reproduction according to the second embodiment has the same configuration as the image reproduction system 10 of the first embodiment.

Figure 5:
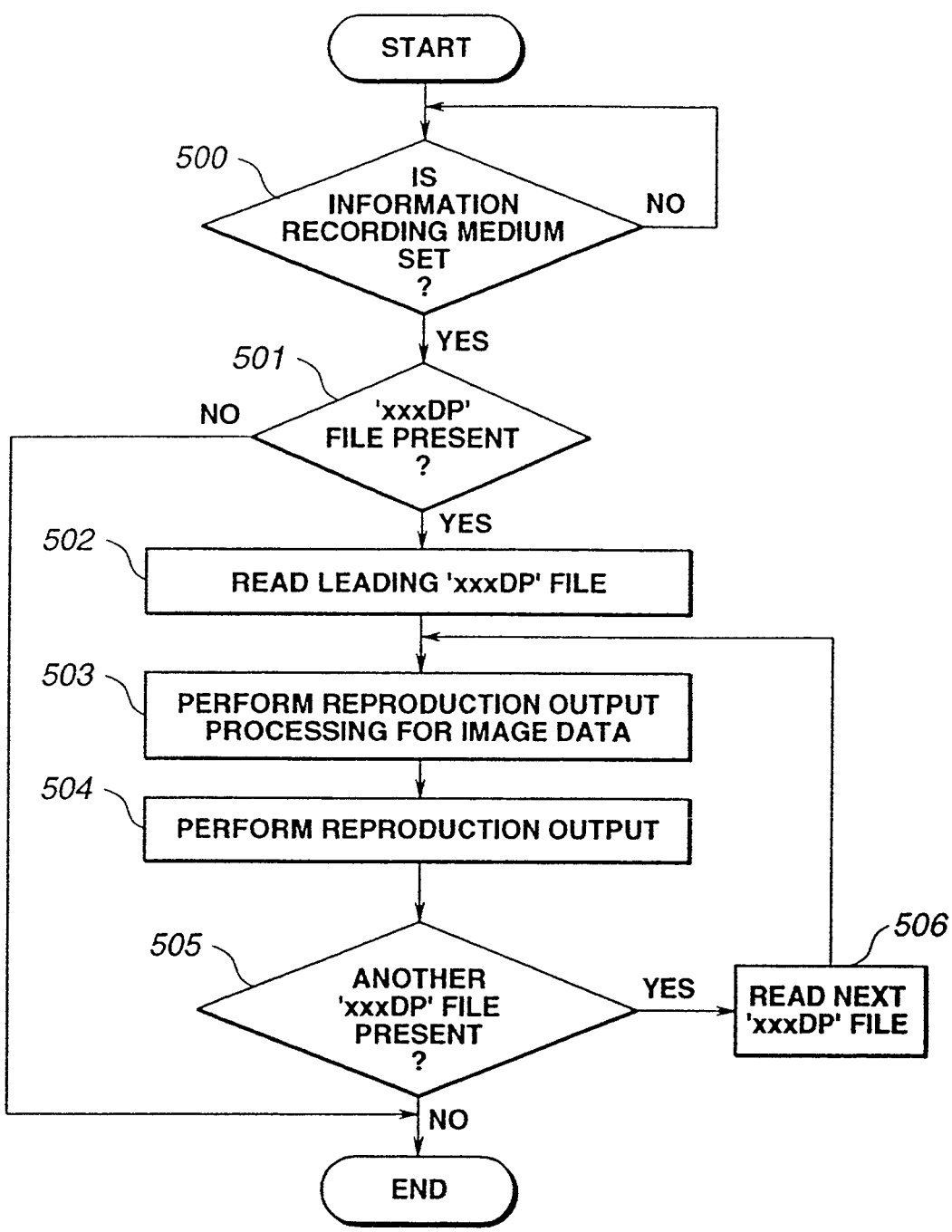
FIG. 5 is a flowchart illustrating the operation of an image reproduction system according to the second embodiment.

Next, a description will be provided of the image reproduction system 10 of the second embodiment. FIG. 5 is a flowchart illustrating the operation of the image reproduction system 10. A program represented by the flowchart is set in the RAM, a hard disk or the like of the system control unit 15 of the image reproduction system 10.

When the image reproduction system 10 has started to operate, for example, by turning on the power supply, the operation of the flowchart is read and executed.

First, in step 500, it is determined if the information recording medium 11 is set in the data reading unit 12. If the result of the determination in step 500 is affirmative, the process proceeds to step 501, where the data reading unit 12 refers to the contents of the root directory recorded in the information recording medium 11 to determine if a 'xxxDP' file is present. If the result of the determination in step 501 is negative, the operation of the second embodiment is terminated. If the result of the determination in step 501 is affirmative, the process proceeds to step 502, where the leading 'xxxDP' file in the file region is read (see FIG. 4(b)).

Then, the image reproduction processing unit 14 performs image reproduction output processing for image reproduction output (printing) for image data stored in the 'xxxDP' file to generate image reproduction output data. In step 504, the generated image reproduction output data is reproduced and output by the image reproduction unit 13. In the second embodiment, JPEG data is used as image data, and the image reproduction unit 13 uses an ink-jet printer as an image reproducing device. Accordingly, the image reproduction processing unit 14 performs processing of obtaining RGB data by defrosting image data stored as JPEG data, color processing, resolution conversion processing, halftoning processing, and the like.

Then, in step 505, it is determined if the next 'xxxDP' file is present by accessing the information recording medium 11. If the result of the determination in step 505 is affirmative, the process proceeds to step 506, where the next IMGxxx file is read, and the process then returns to step 503. If the result of the determination in step 505 is negative, the operation of the image reproduction system of the second embodiment is terminated.

As described above, in the image reproduction system of the second embodiment, desired image data is automatically selected from the information recording medium where the data is recorded according to the image filing method of the second embodiment, and image reproduction output is performed. Accordingly, as described in the second embodiment, by executing the image filing method and the image reproducing method of the present invention, desired image data recorded in the information recording medium can be automatically reproduced and output without assigning the desired image using a memo or the like.

Although in the second embodiment, also, JPEG data is used as image data, image data is not limited to JPEG data. For example, data conforming to TIFF, PICT or the like may also be used. RAW data may also be used. In this case, however, it is necessary to record information relating to image reproduction in the information recording medium together with image data. When using data having a format other than the JPEG format, it is only necessary to change processing performed by the image reproduction processing unit 14 shown in the second embodiment depending on each image data. The present invention is not limited to a specific type of image data being used.

Although in the second embodiment, also, an ink-jet printer is used as the image reproducing device, the present invention is not limited to such a printer. For example, a sublimation-type thermal printer or a silver-halide-film printer may be used. Alternatively, a soft copy display device, such as a CRT, an LCD, a plasma display or the like, may be used. When using such a device, also, it is only necessary to change processing in the image reproduction processing unit 14 shown in the second embodiment so as to perform processing corresponding to a printer or a soft copy display device being used. Accordingly, the present invention may use any appropriate image reproducing device.

In the second embodiment, 'DP' is added to the name of image data to be subjected to image reproduction, in order to indicate that an image of that file is to be reproduced. However, the present invention is not limited to such an approach. It is only necessary that a file name recorded in the root directory has information as image-reproduction instruction data. Accordingly, the present invention may be easily executed even if any other name or mark is used. As described above, the image reproduction system of the present invention checks the feature of a file name which may be arbitrarily determined in advance, and determines if that feature corresponds to a predetermined feature, to determine whether or not image data included in that file is to be reproduced. Accordingly, it is only necessary to record a feature indicating image-reproduction instruction data in a file name, so that the feature used, i.e., a name, a mark, a symbol or the like may be arbitrarily set.

Third Embodiment: Provision of a File Storing a File Name where Image Data to be Subjected to Image Reproduction is Present within a File Region Next, a third embodiment of the present invention will be described.

Figure 6A:
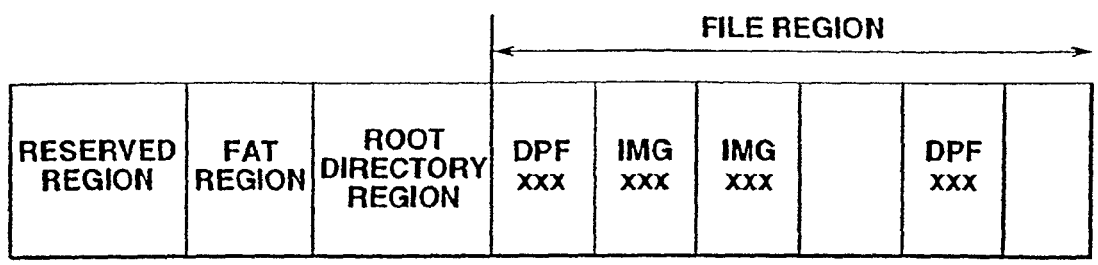
FIGS. 6(a)-6(c) are diagrams illustrating a format of filing recorded images in an information recording medium according to a third embodiment of the present invention.
Figure 6B:
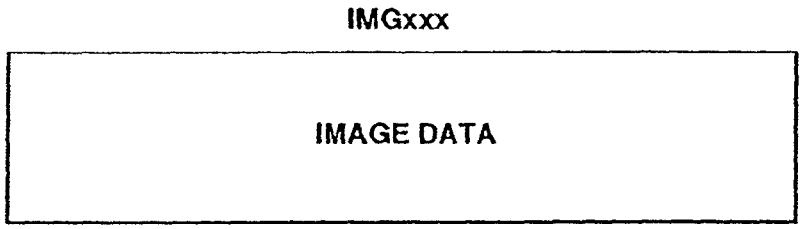
Figure 6C:
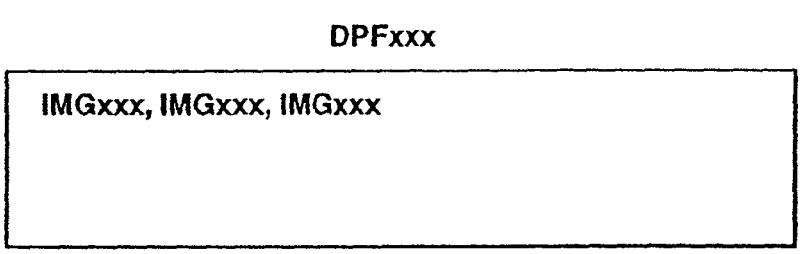

FIGS. 6(a)-6(c) are diagrams illustrating a format of filing images in an information recording medium according to the third embodiment. In the third embodiment, also, as shown in FIG. 6(a), the information recording medium is mapped into four independent areas, i.e., a reserved region, a file allocation table region, a root directory region, and a file region.

The third embodiment differs from the second embodiment mainly in that two kinds of files are recorded in the file region. One is a file having an image-data file to be subjected to image reproduction as the contents of recording. In the third embodiment, the name of such a file is represented by 'DPFxxx' (see FIG. 6(c)). Another is a file having image data itself as the contents of recording. In the third embodiment, the name of such a file is represented by 'IMGxxx'. Thus, a file name having image data to be subjected to image reproduction is recorded in the 'DPFxxx' file.

The image reproduction system 10 for performing image reproduction according to the third embodiment has the same configuration as the image reproduction system 10 of the second embodiment.

Next, a description will be provided of the image reproduction system 10 of the third embodiment.

FIG. 7 is a flowchart illustrating the operation of the image reproduction system 10. A program represented by the flowchart is set in the RAM, a hard disk or the like of the system control unit 15 of the image reproduction system 10.

When the image reproduction system 10 has started to operate, for example, by turning on the power supply, the operation of the flowchart is read and executed.

First, in step 700, it is determined if the information recording medium 11 is set in the data reading unit 12. If the result of the determination in step 700 is affirmative, the process proceeds to step 701, where the data reading unit 12 refers to the contents of the root directory recorded in the information recording medium 11 to determine if a 'DPFxxx' file is present. If the result of the determination in step 701 is negative, the operation of the third embodiment is terminated.

If the result of the determination in step 701 is affirmative, the process proceeds to step 702, where the leading 'DPFxxx' file in the file region is read (see FIG. 6(c)). Then, in step 703, the first file name 'IMGxxx' stored in the read 'DPFxxx' file is read. Then, in step 704, image data corresponding to the 'IMGxxx' file read in step 703 (see FIG. 6(b)) is read. Then, in step 705, the image reproduction processing unit 14 performs image reproduction output processing for image reproduction output (printing) for the image data read in step 704 to generate image reproduction output data. In step 706, the generated image reproduction output data is reproduced and output by the image reproduction unit 13.

In the third embodiment, JPEG data is used as image data, and the image reproduction unit 13 uses an ink-jet printer as an image reproducing device. Accordingly, the image reproduction processing unit 14 performs processing of obtaining RGB data by defrosting image data stored as JPEG data, color processing, resolution conversion processing, halftoning processing, and the like.

Then, in step 707, it is determined if the next 'IMGxxx' file is present in the 'DPFxxx' file currently being accessed (see FIG. 6(c)). If the result of the determination in step 707 is affirmative, the process proceeds to step 708, where the next IMGxxx file is read, and the process then returns to step 704. If the result of the determination in step 707 is negative, the process proceeds to step 709, where it is determined if another 'DPFxxx' file is present by accessing the information recording medium 11.

If the result of the determination in step 709 is affirmative, the process proceeds to step 710, where the next 'DPFxxx' file is read, and the process then returns to step 703. If the result of the determination in step 709 is negative, the operation of the image reproduction system of the third embodiment is terminated.

As described above, in the image reproduction system of the third embodiment, desired image data is automatically selected from the information recording medium where the data is recorded according to the image filing method of the third embodiment, and image reproduction output is performed. Accordingly, as described in the third embodiment, by executing the image filing method and the image reproducing method of the present invention, desired image data recorded in the information recording medium can be automatically reproduced and output without assigning the desired image using a memo or the like.

Although in the third embodiment, also, JPEG data is used as image data, image data is not limited to JPEG data. For example, data conforming to TIFF, PICT or the like may also be used. RAW data may also be used. In this case, however, it is necessary to record information relating to image reproduction in the information recording medium together with image data. When using data having a format other than the JPEG format, it is only necessary to change processing performed by the image reproduction processing unit 14 shown in the third embodiment depending on each image data. The present invention is not limited to a specific type of image data being used.

Although in the third embodiment, also, an ink-jet printer is used as the image reproducing device, the present invention is not limited to such a printer. For example, a sublimation-type thermal printer or a silver-halide-film printer may be used. Alternatively, a soft copy display device, such as a CRT, an LCD, a plasma display or the like, may be used. When using such a device, also, it is only necessary to change processing in the image reproduction processing unit 14 shown in the third embodiment so as to perform processing corresponding to a printer or a soft copy display device being used. Accordingly, the present invention may use any appropriate image reproducing device.

In the third embodiment, two kinds of files are recorded in the file region. One is a file having image data file to be subjected to image reproduction as the contents of recording, and another is a file having image data itself as the contents of recording, having file names of 'DPFxxx' and 'IMGxxx', respectively. In the present invention, the file names are limited to such names, but any file names may be adoped provided that the two kinds of files can be identified.

As described above, the image reproduction system of the present invention checks the feature of a file name which may be arbitrarily determined in advance, and determines if that feature corresponds to a predetermined feature, to determine whether the contents of that file indicate image data or a file name to be subjected to image reproduction. By selectively accessing a file where the file name to be subjected to image reproduction is stored, the file name stored in that file is read, the file corresponding to that file name is read, and image reproduction is performed for image data stored in that file.

Although in the third embodiment, a file name is used as means for discriminating a image-reproduction instruction data file storing a file name to be subjected to image reproduction, the present invention is not limited to such an approach.

Figure 8A:
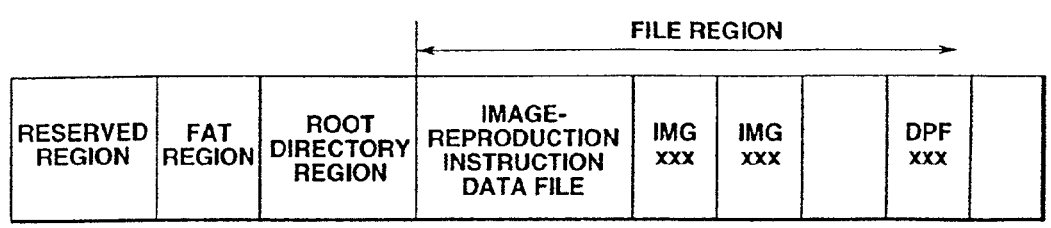
FIGS. 8(a)-8(c) are diagrams illustrating a format of filing recorded images in an information recording medium according to a modification of the third embodiment.
Figure 8B:
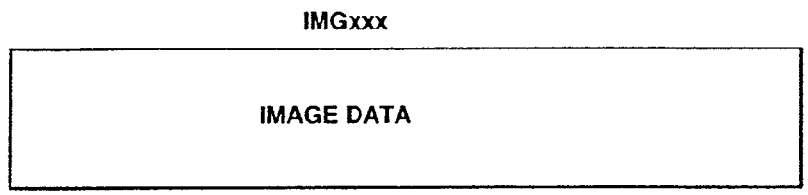
Figure 8C:
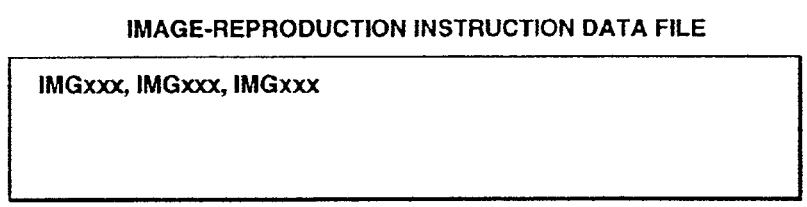

For example, a file format shown in FIGS. 8(*a*)-8(*c*) may be used as an image filing method for executing the present invention. As is apparent from FIG. 8(*a*), in this case, an image-reproduction instruction data file is stored at the leading position of the file region as a particular file. This information is recorded in the root directory and is referred to. That is, when executing the present invention in this manner, the leading file of the file region of the information recording medium corresponds to the image reproduction instruction data file. Hence, in the image reading method of the present invention, by reading information recorded in the leading file of the file region of the information recording medium, a recorded file including image data to be subjected to image reproduction can be easily selected. Furthermore, by preparing a file region dedicated for an image-reproduction instruction data file and recording that data file in the root directory, it is also possible to selectively access the image-reproduction instruction data file. Accordingly, in such a case, also, the present invention can be executed. In this case, although a flowchart is omitted, the image-reproduction instruction data file shown in FIGS. 8(*a*) and 8(*c*) may be searched for instead of the DPFxxx file shown in step 703 in FIG. 7, and image data represented by IMGxxx shown in FIG. 8(*b*) may be accessed whenever necessary.

As described above, in the image reproduction system and apparatus of the present invention, by analizing recorded data at a corresponding position based on the position and the size of predetermined image-reproduction instruction data in the information recording medium, and determining how the contents of that data correspond to predetermined contents of recording, it is determined whether or not image data recorded in the information recording medium is to be reproduced. Accordingly, the image output operation executed in the image reproduction system and apparatus differs in each of the embodiments in accordance with the data recording format of the information recording medium. In each of the above-described embodiments, a program represented by an operational flow corresponding to a recording format used in the embodiment is set in the RAM or the hard disk of the system control unit 15 of the image reproduction system 10.

Dealing with Multiple Formats

Figure 10:
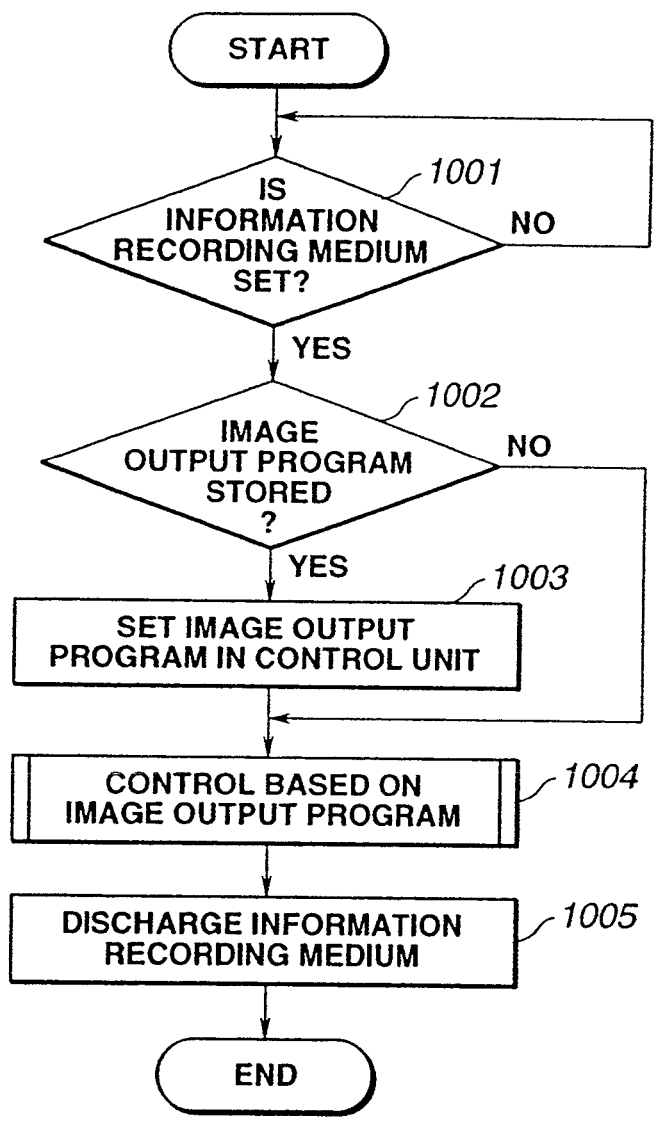
FIG. 10 is a flowchart illustrating the operation of an image reproduction system according to the fourth embodiment.

The present invention is not limited to the configurations of the above-described embodiments. For example, an operational flow can be set or reset within an image reproduction system utilizing an information recording medium or a communication network. FIG. 10 illustrates an operational flow in such a case. The program represented by this operational flow is set in the RAM or the hard disk of the system control unit 15 of the image reproduction system 10.

When the image reproduction system 10 starts, for example, by turning on the power supply, the program represented by this operational flow is read and executed. In this case, an image file is stored in a format corresponding to the stored program. That is, when a plurality of kinds of main formats are present in a state in which standards are not unified, and a medium in which data is recorded with a certain format is loaded, it is possible to perform processing appropriate for that format irrespective of the format. For example, when formats shown in FIGS. 1(*a*)-1(*c*), 4(*a*) and 4(*b*), 6(*a*)-6(*c*), and 8(*a*)-8(*c*) are present, one of the flowcharts shown in FIGS. 3, 5 and 7 (the flowchart corresponding to FIGS. 8(*a*)-8(*c*) is omitted) corresponding to the format is stored in PRG shown in FIG. 9(*a*).

A fourth embodiment of the present invention will now be described with reference to FIG. 10. First, in step 1001, it is determined if the information recording medium 11 is set in the data reading unit 12. If the result of the determination in step 1001 is affirmative, the process proceeds to step 1002, where it is determined if an image output control program PRG is stored in the set information recording medium 11 (see FIG. 9(*a*)). If the result of the determination in step 1002 is affirmative, the process proceeds to step 1003, where the image output control program PRG is set within the system control unit 15 of the system.

If the result of the determination in step 1002 is negative, the process proceeds to step 1004, where the system performs an operation in accordance with an image output control program set in the system control unit 15 of the system (a default program, for example, one of the programs represented by the flowcharts shown in FIGS. 3, 5 and 7 may be used). Upon completion of a series of operations, the process returns to this operational flow. Then, in step 1005, the set information recording medium 11 is discharged to terminate the process.

Figure 9A:
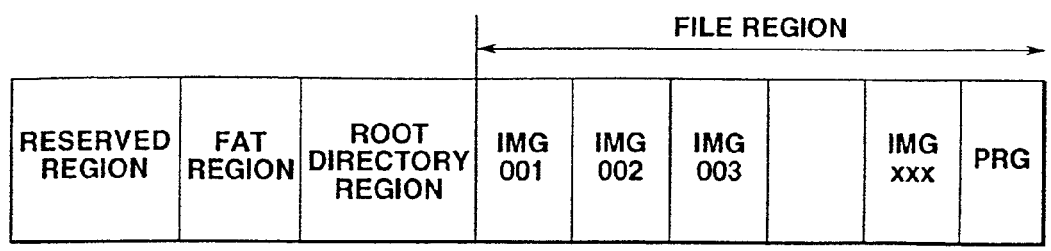
FIGS. 9(a)-9(c) are diagrams illustrating a format of filing recorded images in an information recording medium according to a fourth embodiment of the present invention.
Figure 9B:
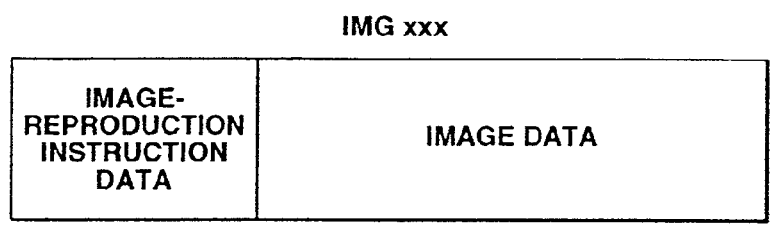
Figure 9C:
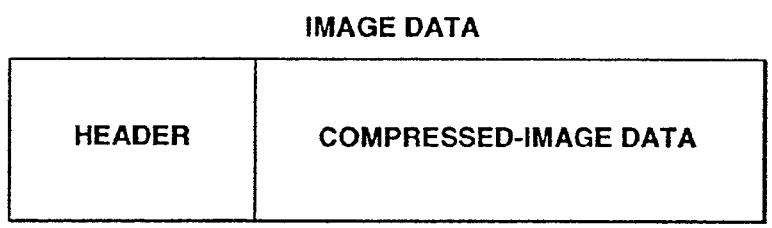

In order to execute the fourth embodiment, an image output control program must be recorded in the information recording medium 11. FIGS. 9(*a*)-9(*c*) illustrate an image recording medium format of the information recording medium 11. The image output control program is recorded in the file region in the name of PRG.

In the fourth embodiment, by confirming if the file having that name is present, it is confirmed that the image output control program is stored in the information recording medium. As described above, if the type of a program corresponds to a format, the type of a program (for example, one of the programs shown in FIGS. 3, 5 and 7) and the type of the format corresponding to the program (for example, one of formats shown in FIGS. 1(*a*)-1(*c*), 4(*a*) and 4(*b*), 6(*a*)-6(*c*), and 8(*a*)-8(*c*)) are identified according to the name of the program. In the present invention, it is only necessary to store an image output control program in the information recording medium 11, and to provide the image reproduction system and apparatus with means for accessing the program. For example, if the above-described file is present at a determined position, and that position is set in the image reproduction system and apparatus of the present invention, it is also possible to access the image output control program of the information recording medium based on that information. Hence, the present invention is not limited to the method of the fourth embodiment.

Direct Access to a Program

Figure 11:
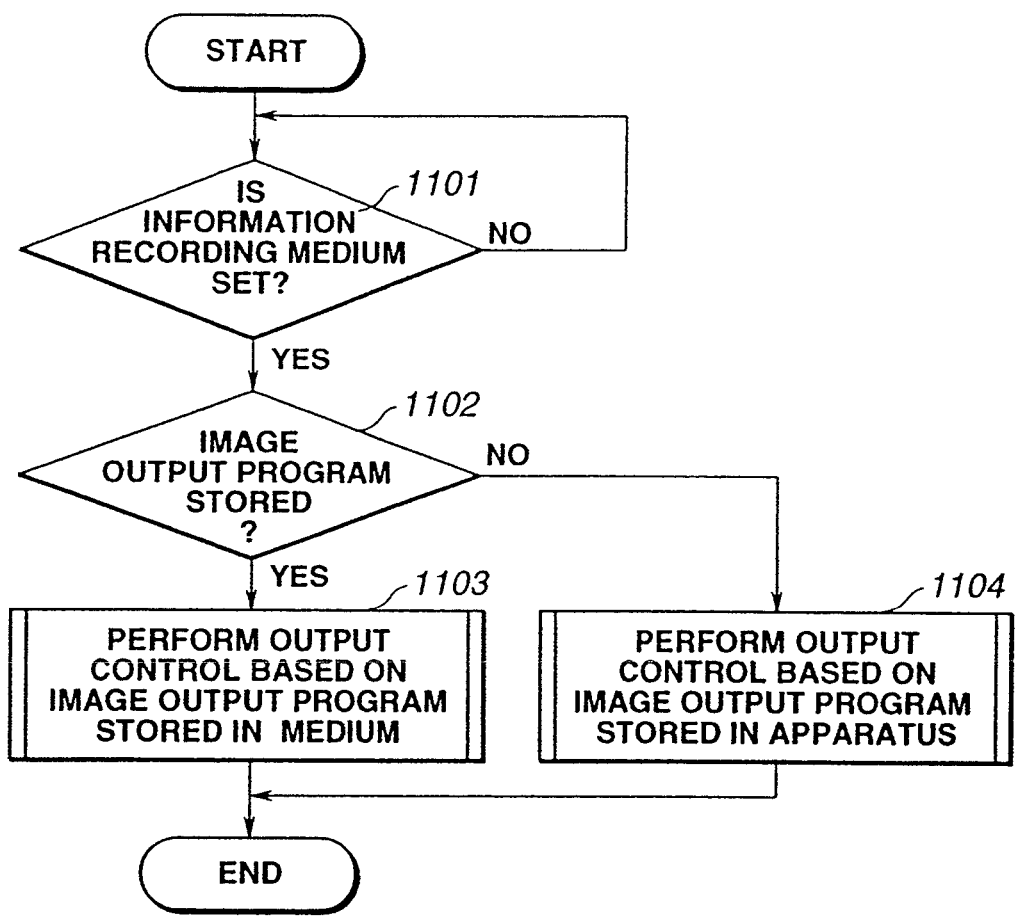
FIG. 11 is a flowchart illustrating the operation of an image reproduction system according to a modification of the fourth embodiment of the present invention.

In the fourth embodiment, when an image output control program is stored in an information recording medium, image output control is performed by first storing the image output control program in the memory or the like of the system control unit of the image reproduction system. However, the present invention is not limited to such an approach. For example, it is also possible to output an image by performing image output control by directly accessing the program stored in the information recording medium. FIG. 11 illustrates an operational flow in such a case. The operation of this case is substantially the same as in the fourth embodiment shown in FIG. 10, except performing direct access to the image output program stored in the information recording medium. Hence, further description thereof will be omitted. In step 1103, output control is performed based on a program stored in the medium. If the program is not stored in the medium as a result of determination in step 1102, the process proceeds to step 1104, where output control is performed based on an image output program stored in the apparatus.

Provision of a Plurality of Slots

Figure 13:
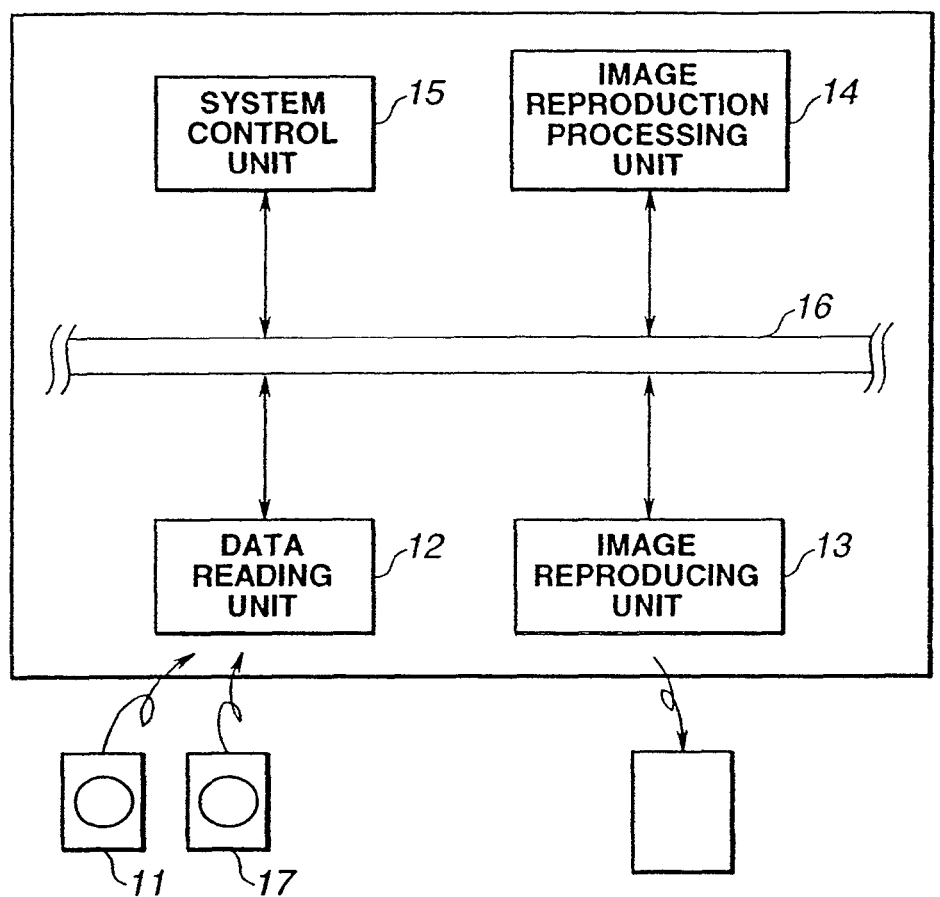
FIG. 13 is a diagram illustrating the image reproduction system for performing image reproduction according to the fifth embodiment.

FIG. 13 is a diagram illustrating the configuration of an image reproduction system (apparatus) according to a fifth embodiment of the present invention. The basic configuration of the apparatus is the same as the configuration in the first embodiment shown in FIG. 2. In the fifth embodiment, slots, each for an information recording medium, is provided in the data reading unit. One of the slots is for an information recording medium for recording image data and information-reproduction instruction data for instructing whether or not the image data is to be reproduced, as in the first embodiment. Another slot is for a medium storing a program for controlling an image output operation of the image reproduction system of the invention.

Figure 12:
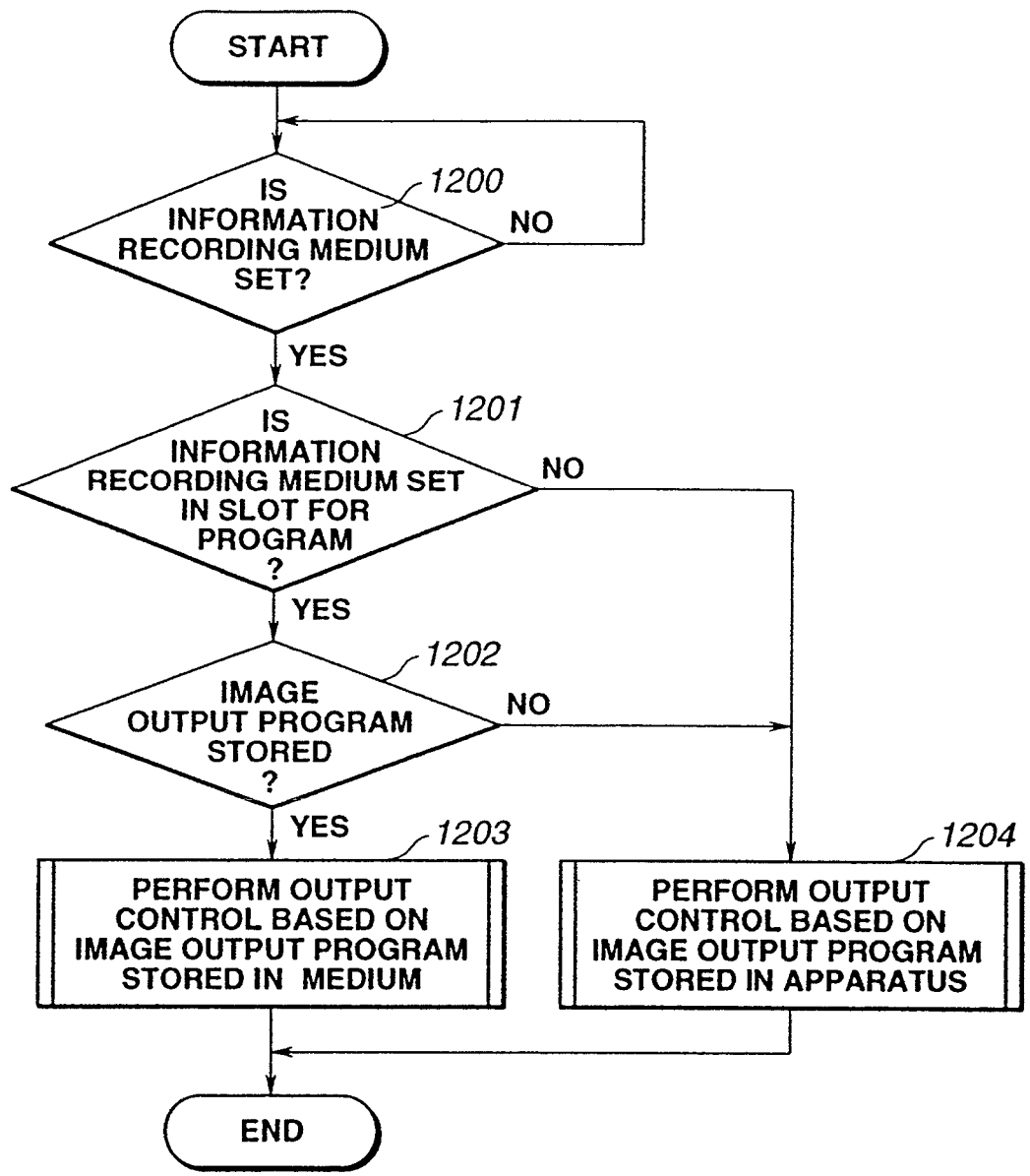
FIG. 12 is a flowchart illustrating the operation of an image reproduction system according to a fifth embodiment of the present invention.

FIG. 12 illustrates the operational flow of the fifth embodiment. This operational program is set in the RAM, the hard disk or the like of the system control unit of the image reproduction system.

When the image reproduction system has started, for example, by turning on the power supply, the operational flow is read and executed.

First, in step 1200, it is determined if the information recording medium 11 is mounted in a slot. If the result of the determination in step 1200 is affirmative, the process proceeds to step 1201, where it is determined if the information recording medium 11 is set in the slot for program of the data reading unit. If the result of the determination in step 1201 is affirmative, the process proceeds to step 1202, where it is determined if an image output control program is present in the information recording medium 11. If the result of the determination in step 1202 is affirmative, the process proceeds to step 1203, where the image reproduction system is controlled by the image output control program stored in the information recording medium 11, to execute image output. If the result of the determination in step 1201 or 1202 is negative, it may be determined that only a recording medium for image data is set on another slot for image data, or that a medium for image data is erroneously set in the slot for a program, and the process proceeds to step 1204, where the image reproduction system is controlled by an image output control program stored in the system in advance, to execute image output. Then, the process is terminated. When both a medium for a program and a medium for image data are mounted in the corresponding slots, image reproduction processing is, of course, selectively performed based on image-reproduction instruction data stored in the set medium for image data in the above-described manner, based on the program.

Example of Image Reproduction System

Next, a description will be provided of the structure of a printer of the image reproduction system to which any one of the embodiments can be applied.

The configurations of a laser-beam printer and an ink-jet printer to which any one of the embodiments can be applied will be described with reference to FIGS. 14 and 15, respectively. The printer to which any one of the embodiments is applied is not limited to a laser-beam printer or an ink-jet printer, but any other appropriate printer may, of course, be adopted.

Figure 14:
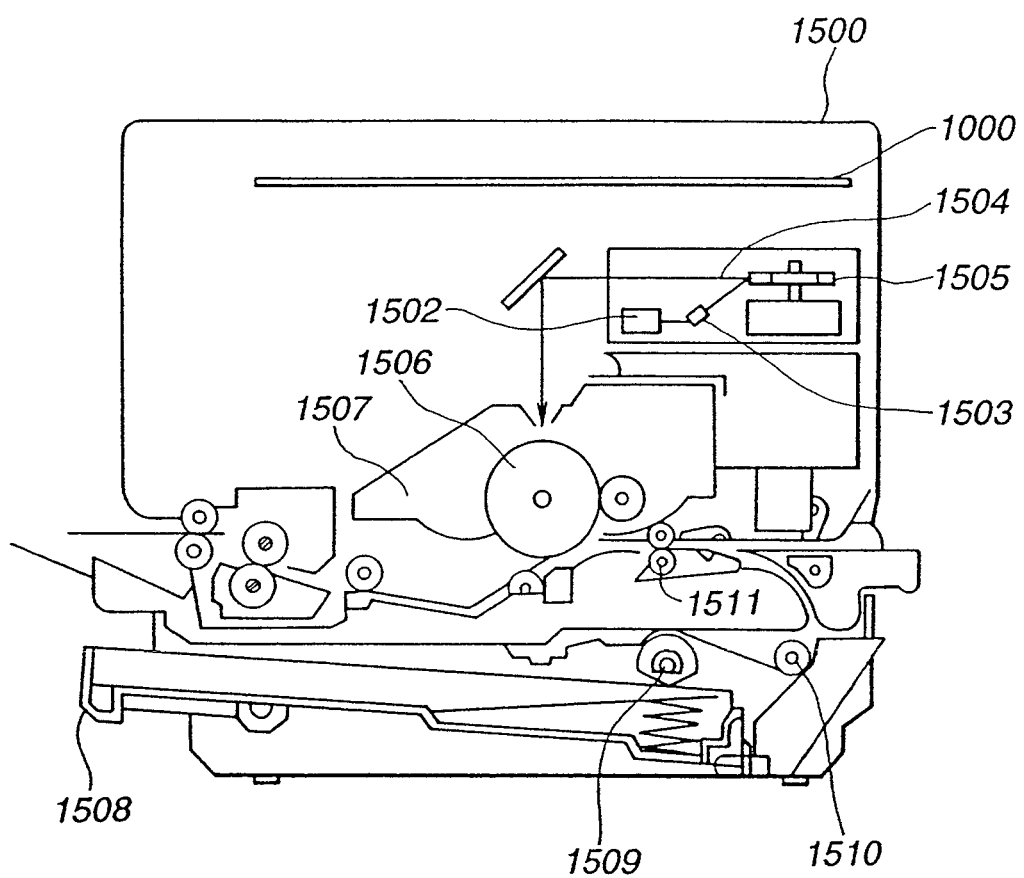
FIG. 14 is a diagram illustrating the structure of a first recording apparatus to which the present invention can be applied.

FIG. 14 is a cross-sectional view illustrating the configuration of a first recording apparatus to which the present invention can be applied, for example, a laser-beam printer (LBP).

In FIG. 14, a main body 1500 of the LBP (printer) receives and stores printing information (character codes or the like), form information, a macrocommand or the like supplied from a host computer connected to the printer, forms character patterns, a form pattern or the like in accordance with the information, and forms an image on recording paper, serving as a recording medium. A printer control unit 1000 controls the entirety of the LBP main body 1500 and analyzes character information or the like supplied from the host computer. The printer control unit 1000 mainly converts character information into a video signal representing corresponding character patterns, and outputs the video signal to a laser driver 1502. The laser driver 1502 is a circuit for driving a semiconductor laser 1503, and performs on-off switching of a laser beam 1504 emitted from the semiconductor laser 1503 in accordance with the input video signal. The laser beam 1504 is deflected in a direction perpendicular to the plane of FIG. 14 by a rotating polygonal mirror 1505 to scan and expose an electrostatic drum 1506. An electrostatic latent image of the character patterns is thereby formed on the electrostatic drum 1506. The electrostatic latent image is developed by a developing unit 1507 disposed around the electrostatic drum 1506, and the developed image is transferred onto recording paper. A cut sheet is used as the recording paper. Cut sheets of the recording paper are accommodated in a sheet cassette 1508 mounted in the LBP main body 1500, and is supplied to the electrostatic drum 1506 by being received into the printer by a sheet feeding roller 1509 and conveying rollers 1510 and 1511. A color image may also be obtained according to the same configuration.

Figure 15:
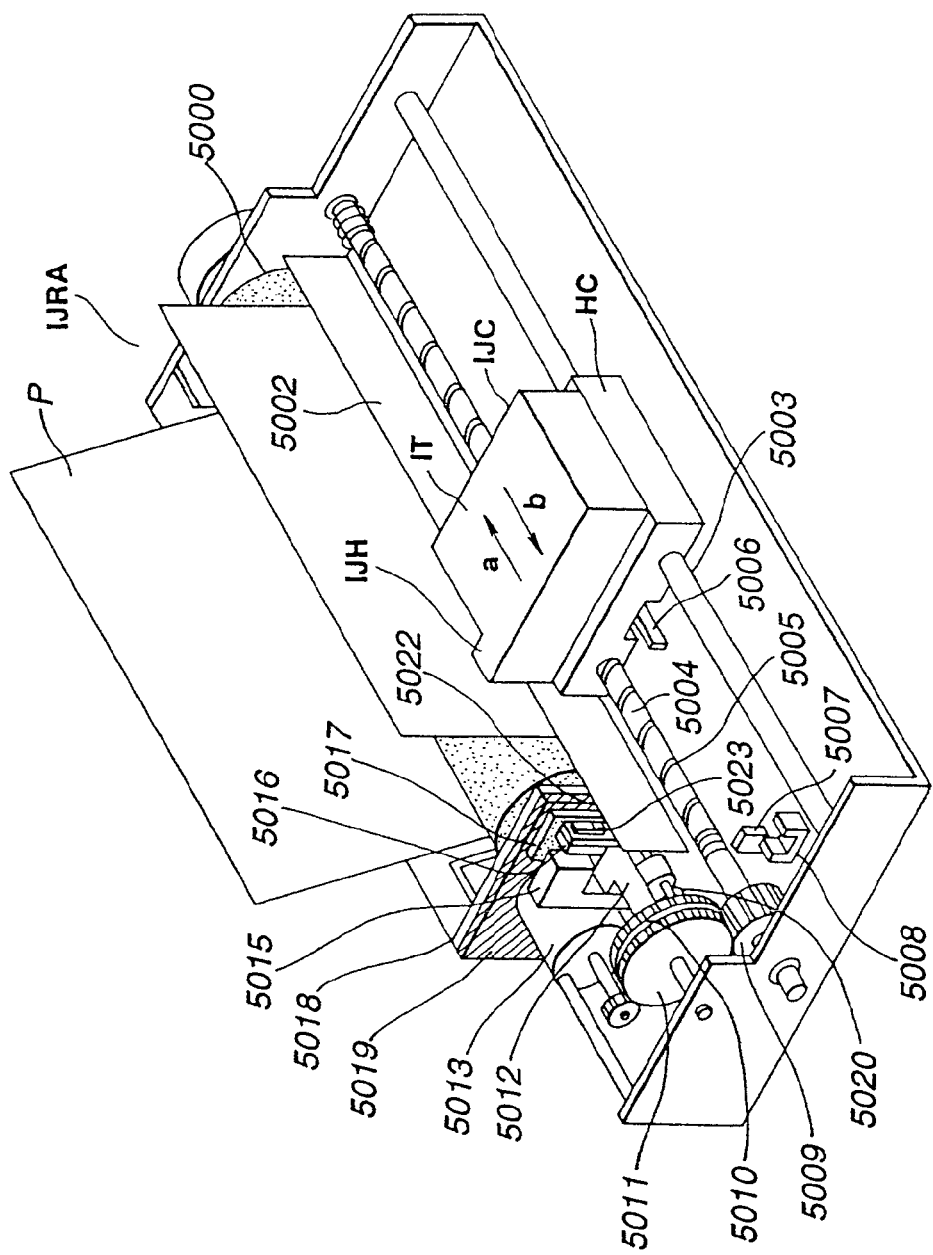
FIG. 15 is a diagram illustrating the structure of a second recording apparatus to which the present invention can be applied.

FIG. 15 is an external-appearance diagram illustrating the configuration of a second recording apparatus to which the present invention can be applied, for example, an ink-jet recording apparatus (IJRA).

In FIG. 15, a carriage HC engaging with a helical groove 5004 of a lead screw 5005 rotated in a state of being linked with forward/reverse revolutions of a driving motor 5013 via driving-force transmission gears 5011 and 5009 has a pin (not shown), and is reciprocated in directions of arrows a and b via a guide rail 5003. An ink-jet cartridge IJC including an ink tank IT and an ink-jet head IJH is mounted on the carriage HC. A sheet pressing plate 5002 presses a sheet against a platen 5000 along the carriage moving direction. The head can also output a color image. Driving is not limited to a specific method. For example, a piezoelectric method, an air flow method, a sublimation-method or the like may be adopted.

A photocoupler 5007, 5008 operates as home-position detection means for confirming presence of a carriage lever 5006 in this region, and performing, for example, switching of the direction of revolution of the driving motor 5013. Reference numeral 5016 represents a member which operates a cap member 5022 for capping the entire surface of the recording head. Reference numeral 5015 represents suction means for sucking the inside of the cap. The suction means 5015 performs suction recovery of the recording head via an opening 5023 provided in the cap. A cleaning blade 5017 is movable in forward and reverse directions by a member 5019. A main-body supporting plate 5018 supports the cleaning blade 5017 and the member 5019. A lever 5012 for starting suction of suction recovery is moved in accordance with the movement of a cam 5020 engaging the carriage. The driving force from the driving motor 5013 is subjected to movement control by known transmission means, such as clutch switching or the like.

For each of these capping, cleaning and suction recovery, desired processing can be performed at a corresponding position by the function of the lead screw 5005 when the carriage reaches the home position side region. It is only necessary to perform a desired operation at a well-known timing.

Sixth Embodiment

Next, a description will be provided of a sixth embodiment of the present invention in which the present invention is further improved.

An image reproduction method, and an image reproduction system and apparatus according to the sixth embodiment will now be described in detail with reference to the drawings. The sixth embodiment has the feature that the apparatus includes display means for displaying image-reproduction instruction data and image data, and that the display means displays a summary, or a mark indicating whether or not the displayed image is an image to be reproduced, or whether or not all images to be reproduced can be output based on the number of images outputtable by the apparatus.

FIG. 16 illustrates an image reproduction system (apparatus) 10 which executes an image reproduction method according to the sixth embodiment. This image reproduction apparatus (system) 10 automatically selects desired image data from among image data recorded in an information recording medium 11, and performs reproduction output (printing) of an image represented by the selected image data. In the fifth embodiment, a CF is used as the information recording medium 11. The information recording medium 11 is not limited to the CF. For example, a floppy disk or the like may also be used. The image reproduction system (apparatus) 10 includes a data reading unit 12 for reading recorded data, comprising image-reproduction instruction data and image data, recorded in the information recording medium 11, and outputting the recorded data to a bus 16, a system control unit 15 for controlling the operations of the entire system by controlling respective units of the image reproduction system 10, an image reproduction processing unit 14 for receiving image data read by the data reading unit 12 under the control of the system control unit 15 and output to the bus 16, and converting the image data into reproduction output data for performing reproduction output and outputting the reproduction output data, an image reproducing unit 13 for receiving the reproduction output data to perform reproduction output (printing), a data processing unit 170 for analyzing the contents of image-reproduction instruction data by selectively accessing that data, and a data display unit 180 for displaying a summary of images to be reproduced in accordance with the result of the data processing unit 170. In the sixth embodiment, a thumbnail image is displayed on the data display unit 180. However, the present invention is not limited to such a display. For example, the name of each image file may be displayed.

Figure 17A:
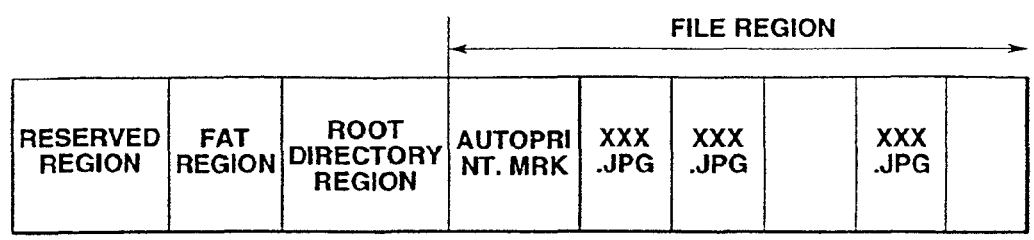
FIGS. 17(a)-17(c) are diagrams illustrating a format of filing recorded images in an information recording medium according to the sixth embodiment.
Figure 17B:
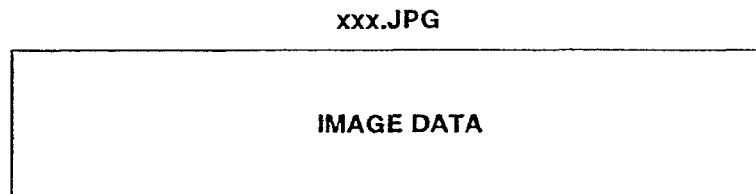
Figure 17C:
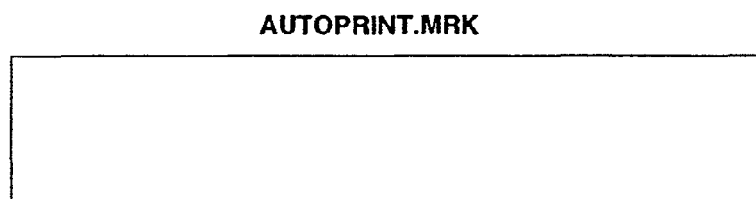

FIGS. 17(a)-17(c) illustrate a format of filing images in an information recording medium according to the sixth embodiment.

In the sixth embodiment, the information recording medium is mapped into four independent areas, i.e., a reserved region, a file allocation table region, a root directory region, and a file region. In the reserved region, the number of entries within a root directory, the size of the reserved region, and the size of a file allocation table (FAT) in the information recording medium are recorded.

In the file allocation table, the state of use of an information recording medium space in the file region of the information recording medium is recorded. In a root directory, directory-entry information indicating information relating to the name, the size, the position and the like of each file recorded in the information recording medium is recorded. In the file region, actual image data and image-reproduction instruction data are recorded.

In the sixth embodiment, at least two kinds of files are used as files to be recorded in the file region. One is a file having image data itself as the contents of recording. In the sixth embodiment, a file having a format of JPEG data is used. For the convenience of explanation, such a file is hereinafter named 'XXX.JPG'. The file name is not limited to this format, but any other appropriate format may be adopted provided that image files can be classified.

In the JPEG format, original image data is recorded by being compressed. Information for restoring the compressed image data into the original image data is recorded as header information constituting a part of the image data. The header information includes, for example, information relating to the size of the image.

Another file is a file having an image data file to be subjected to image reproduction and additional information relating to the file as the contents of recording. In the sixth embodiment, such a file is named 'AUTOPRINT.MRK'.

FIG. 18 illustrates an example of the contents of recording of 'AUTOPRINT.MRK'.

<PRE>

CIFF_VERSION=1.00 is header information of the file.

The image data file to be subjected to image reproduction is represented by providing the following tag:

<IMG SRC="XXX.JPG">.

The data file to be subjected to image reproduction is indicated within parentheses < >.

CIFF_PRINT_COUNT=1 is an example of a tag indicating additional information, and indicates, in the sixth embodiment, the number of prints of the image reproduction data file indicated immediately before the tag.

Accordingly, by checking the contents of recording of AUTOPRINT.MRK, the image data file to be subjected to image reproduction and the total number of images to be reproduced can be obtained.

For example, as for the 'AUTOPRINT.MRK' shown in FIG. 18, image files to be subjected to image reproduction are 'AOO.JPG' and 'A03.JPG', and the total number of images to be reproduced is 3.

This file is edited using input means of a personal computer or a digital camera. This file is edited by determining whether an image is to be reproduced during a photographing operation, and also, for example, when reading recorded data and adding the read data to an image to be reproduced while confirming necessity of reproduction of the data.

Next, a description will be provided of the operation of the image reproduction system (apparatus) 10 of the sixth embodiment.

Figure 19:
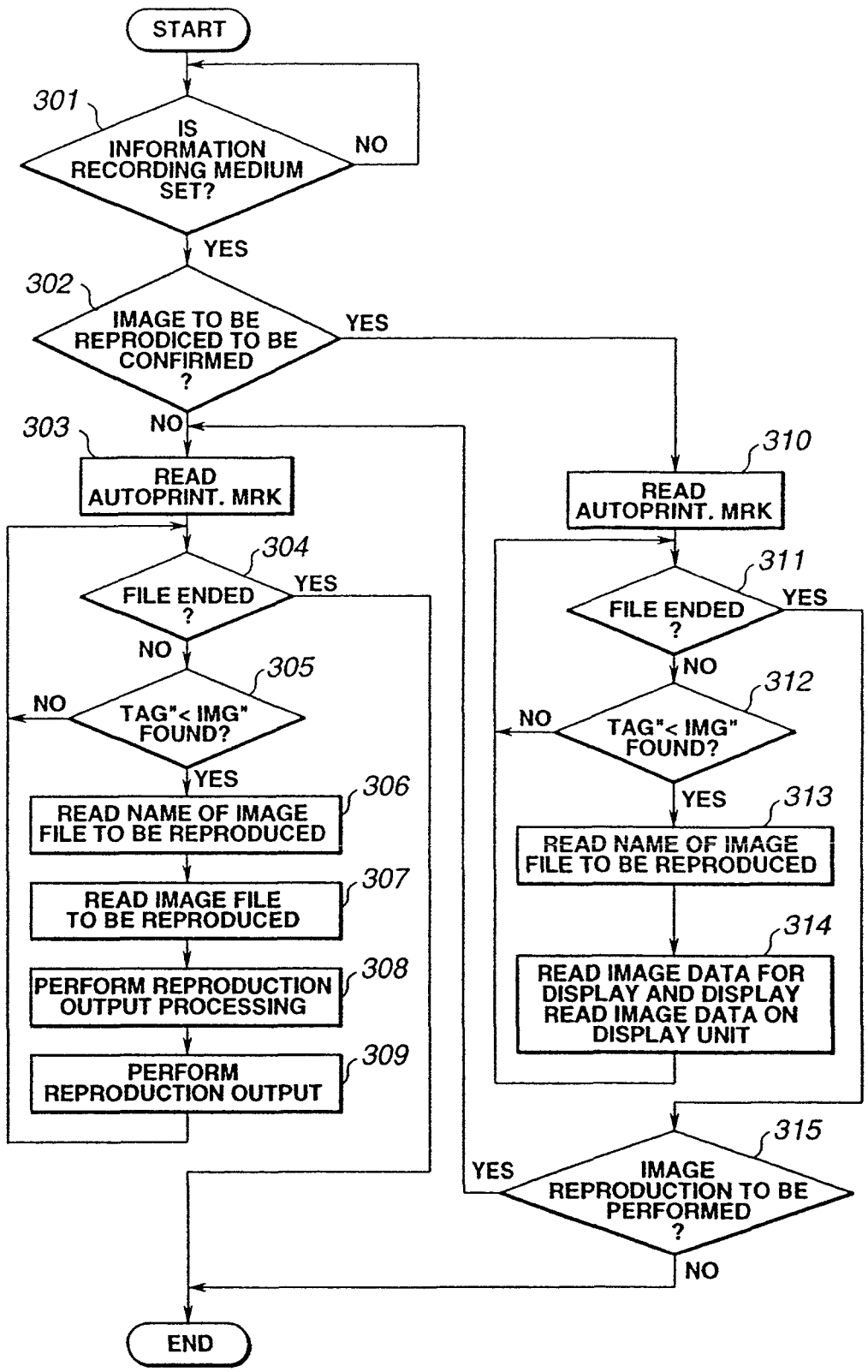
FIG. 19 is a flowchart illustrating the operation of an image reproduction system according to the sixth embodiment.

FIG. 19 illustrates the operational flow of the image reproduction system 10 of the sixth embodiment. The program represented by the operational flow is set in a RAM, a hard disk or the like of the system control unit 15 of the image reproduction system 10.

When the image reproduction system 10 has started, for example, by turning on the power supply, the operational flow is read and executed.

First, in step 301, it is determined if the information recording medium 11 is set in the data reading unit 12. If the result of the determination in step 301 is affirmative, the process proceeds to step 302, where it is determined if an image to be reproduced is to be confirmed. This determination is provided in advance using a switch of the user interface. If the result of the determination in step 302 is affirmative, the process proceeds to step 310. If the result of the determination in step 302 is negative, the process proceeds to step 303.

First, the case of proceeding to step 310 will be described followed by description of the case of proceeding to step 303.

In step 310, the data reading unit 12 reads an AUTOPRINT.MRK file from among files recorded in the information recording medium 11. The contents of the read file are sequentially transferred to the data processing unit 170 to be analyzed. In step 311, the end of the file is confirmed. When the end of the file is not confirmed, the contents of the file are continued to be analyzed, and in step 312, it is determined if TAG"<IMG" is present. If the result of the determination in step 312 is negative, the process returns to step 311, where analysis of the contents of the file is continued while confirming the end of the file. If the result of the determination in step 312 is affirmative, the process proceeds to step 313, where the name of the image file to be subjected to image reproduction "XXX.JGP" is read from the contents of the file SRC="XXX.JPG" recorded after the TAG"<IMG".

In step 314, image data to be displayed corresponding to the image file to be subjected to image reproduction is read based on the read name of the image file to be subjected to image reproduction, and is displayed on the data display unit 180. In the sixth embodiment, data prepared in advance as a thumbnail image is used as image data to be displayed.

In the sixth embodiment, JPEG data is used as image data for display, and the data display unit 180 uses a CRT as the image display device. Accordingly, the data processing unit 170 performs processing of obtaining RGB data by defrosting image data for display stored as JPEG data, color processing, resolution conversion processing, and the like.

When data display has been performed, the process returns to step 311, where the system continues analysis of the contents of the AUTOPRINT.MRK file while confirming the end of the file.

Until the end of the file is confirmed, the analysis of the contents is performed by executing the processes of steps 311, 312, 313 and 314.

Figure 24A:
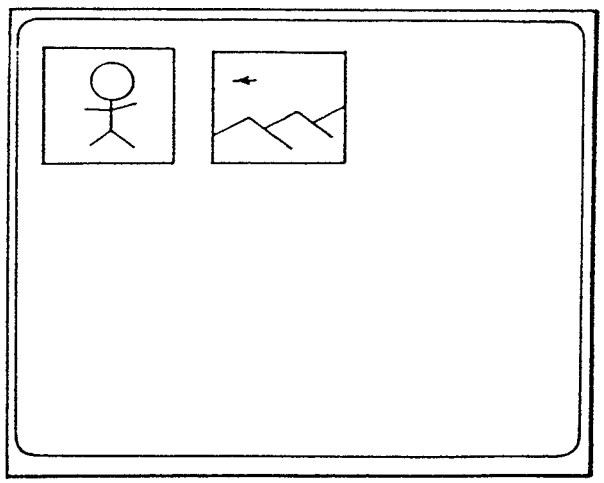
FIGS. 24(a), 24(b) and 24(c) illustrate examples of displays indicating images to be reproduced in the eighth embodiment.
Figure 24B:
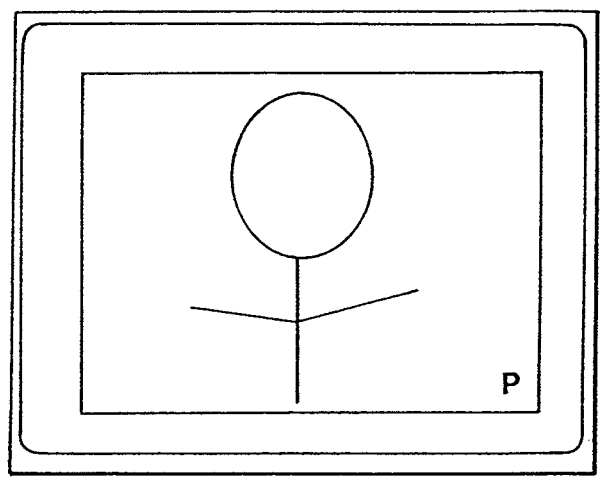
Figure 24C:
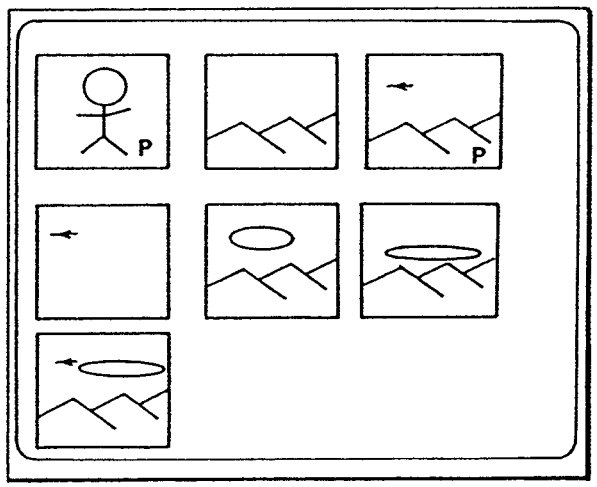

The image files to be subjected to image reproduction are sequentially added to the data display unit 180 to be displayed thereon, and a summary of images are displayed. FIGS. 24(a)-24(c) are examples of such display.

When the end of the file has been confirmed in step 311, the process proceeds to step 315, where it is determined if the confirmed image is to be reproduced. This determination is provided using a switch of the user interface. If the result of the determination in step 315 is affirmative, the process proceeds to step 303, where image reproduction is performed. If the result of the determination in step 315 is negative, the process is terminated.

Next, a description will be provided of the case of proceeding to step 303 and performing image reproduction.

In step 303, the data reading unit 12 reads an AUTOPRINT. MRK file from among files recorded in the information recording medium 11. The contents of the read file are sequentially transferred to the data processing unit 170 to be analyzed. In step 304, the end of the file is confirmed. When the end of the file is not confirmed, the contents of the file are continued to be analyzed, and in step 305, it is determined if TAG"<IMG" is present. If the result of the determination in step 305 is negative, the process returns to step 304, where the analysis of the contents of the file is continued while confirming the end of the file. If the result of the determination in step 305 is affirmative, the process proceeds to step 306, where the name of the image file to be subjected to image reproduction "XXX.JGP" is read from the contents of the file SRC="XXX.JPG" recorded after the TAG"<IMG".

In step 307, image data stored in the image file to be subjected to image reproduction is read based on the read name of the image file to be subjected to image reproduction. In step 308, the image reproduction processing unit 14 executes image reproduction output processing for image reproduction output (printing), to generate image reproduction output data. The generated image reproduction output data is subjected to reproduction output (printing) by the image reproducing unit 13.

In the sixth embodiment, JPEG data is used as image data, and the data reproducing unit 13 uses an ink-jet printer as the image reproducing device. Accordingly, the image reproduction processing unit 14 performs processing of obtaining RGB data by defrosting image data stored as JPEG data, color processing, resolution conversion processing, halftoning processing, and the like.

When image reproduction output (printing) has been performed, the process returns to step 304, where the system continues the analysis of the contents of the AUTOPRINT. MRK file while confirming the end of the file.

Until the end of the file is confirmed, the analysis of the contents is performed by executing the processes of steps 304, 305, 306, 307, 308 and 309.

When the end of the file has been confirmed in step 304, the system terminates its operation.

As described above, in the image reproduction system of the sixth embodiment, desired image data is automatically selected from the information recording medium where the data is recorded according to the image filing method of the sixth embodiment, and image reproduction output is performed. Accordingly, as described in the sixth embodiment, by executing the image filing method and the image reproducing method of the present invention, desired image data recorded in the information recording medium can be automatically reproduced and output without assigning the desired image using a memo or the like.

Furthermore, since means for confirming an image to be reproduced is provided, it is possible to easily confirm the image to be reproduced by the user's instruction before automatically performing image reproduction.

Although in the sixth embodiment, JPEG data is used as image data and image data for display, image data is not limited to JPEG data. For example, data conforming to TIFF, PICT or the like may also be used. RAW data may also be used. In this case, however, it is necessary to record information relating to image reproduction in the information recording medium together with image data. When using data having a format other than the JPEG format, it is only necessary to change processing performed by the image reproduction processing unit 14 and the data processing unit 170 shown in the sixth embodiment depending on each image data. The present invention is not limited to a specific type of image data being used.

Although in the sixth embodiment, an ink-jet printer is used as the image reproducing device, the present invention is not limited to such a printer. For example, a sublimation-type thermal printer or a silver-halide-film printer may be used. Although a CRT is used as the data display device, the present invention is not limited to such a device. For example, an LCD, a plasma display, an LED display, or any other printer may be used. When using such a device, also, it is only necessary to change processing in the image reproduction processing unit 14 and the data processing unit 170 shown in the sixth embodiment so as to perform processing corresponding to a printer or a soft copy display device being used. Accordingly, the present invention may use any appropriate image reproducing device and data display device.

In the image reproduction system of the present invention, by analizing recorded data at a corresponding position based on the position and the size of image-reproduction instruction data in a file, and determining how the contents of the data correspond to predetermined contents of recording, it is determined whether or not image data recorded in the file is to be reproduced. Accordingly, it is only necessary that image data and image-reproduction instruction data for instructing whether or not the image data is to be reproduced are recorded in the file. There is no limitation in the position, the size, the contents, the order and the like of recording.

Seventh Embodiment

In the above-described sixth embodiment, a description has been provided of the case of displaying a summary of information relating to an image to be reproduced on a data display unit in order to confirm the image before reproducing the image in an image reproduction system and apparatus for automatically reproducing image data recorded in an information recording medium.

In order to confirm an image to be displayed, information relating to image data recorded in the information recording medium (may be the corresponding image itself, the name of the image file, the number of the file, or the like) may be displayed, and whether or not the image is to be reproduced may also be displayed at that time.

A description will now be provided of such an approach according to a seventh embodiment of the present invention.

An image reproduction system according to the seventh embodiment has the same configuration as the image reproduction system of the sixth embodiment.

The operation of the image reproduction system 10 in the seventh embodiment will now be described.

Figure 20:
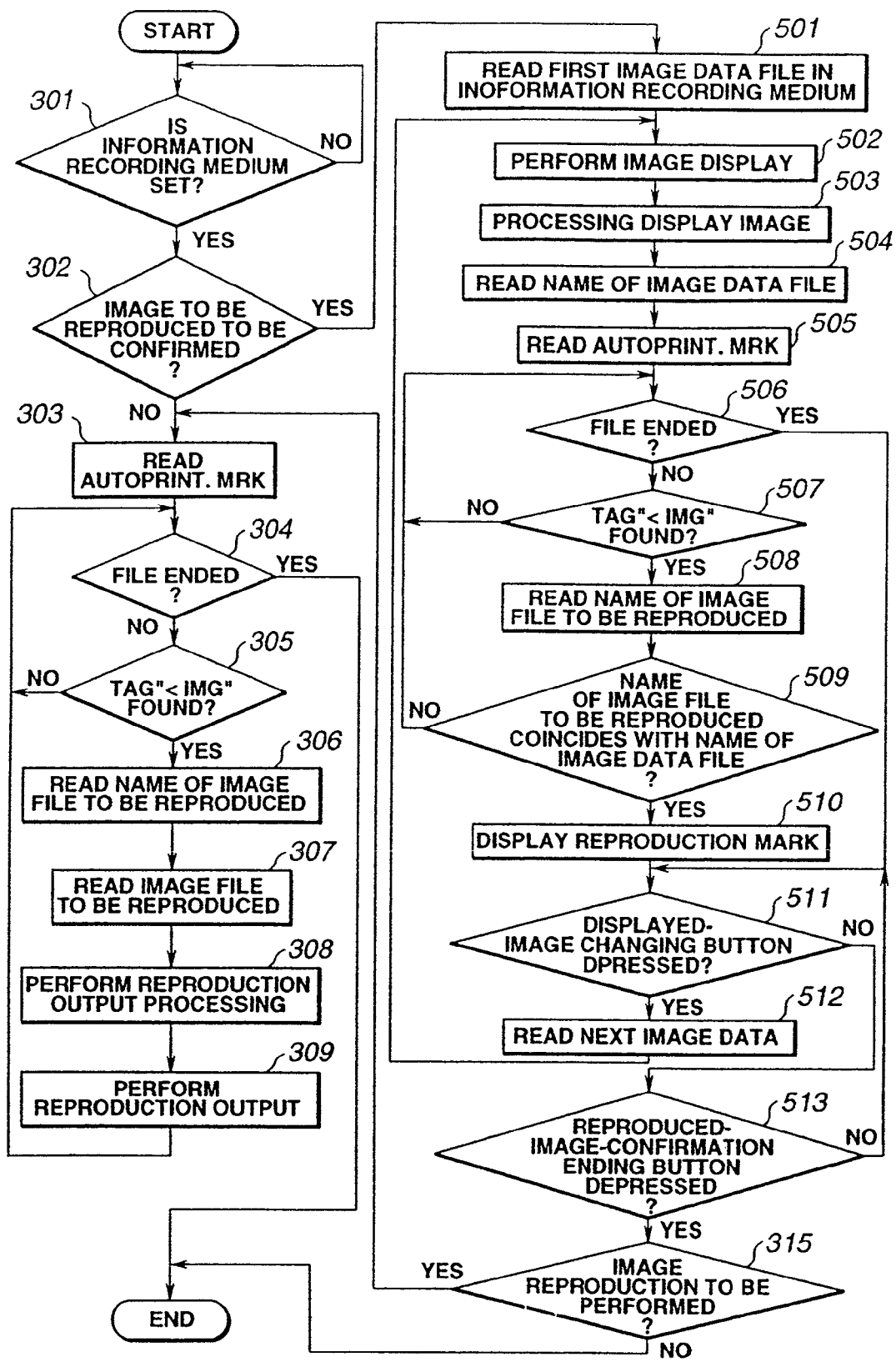
FIG. 20 is a flowchart illustrating the operation of an image reproduction system according to a seventh embodiment of the present invention.

FIG. 20 illustrates the operational flow of the image reproduction system 10 of the seventh embodiment.

A part of the operational flow of the seventh embodiment is the same as the operational flow shown in FIG. 19. Since processes having the same step numbers as in FIG. 19 perform the same operations, a further description thereof will be omitted.

The seventh embodiment differs from the sixth embodiment mainly in the operational flow of confirming an image to be reproduced. Hence, the operational flow of such a portion will be particularly described. As for the operational flow which is not described in the seventh embodiment, refer to the foregoing description.

This operational flow is set in the RAM, the hard disk or the like of the system control unit 15 of the image reproduction system 10.

When the image reproduction system 10 has started, for example, by turning on the power supply, the operational flow is read and executed.

First, in step 301, it is determined if the information recording medium 11 is set in the data reading unit 12. If the result of the determination in step 301 is affirmative, the process proceeds to step 302, where it is determined if an image to be reproduced is to be confirmed. This determination is provided in advance using a switch of the user interface. If the result of the determination in step 302 is affirmative, the process proceeds to step 501. If the result of the determination in step 302 is negative, the process proceeds to step 303.

In step 303, image data is reproduced from the information recording medium in accordance with the contents described in an AUTOPRINT.MRK file. This operational flow is the same as in the sixth embodiment.

A description will now be provided of the case of proceeding to step 501.

In step 501, the first image data in the information recording medium is read. Then, in step 502, the data processing unit 170 performs processing for data display. Then, in step 503, the image data is displayed on the data display unit 180.

In the seventh embodiment, JPEG data is used as image data, and the data display unit 180 uses a CRT as the image display device. Accordingly, the data processing unit 170 performs processing of obtaining RGB data by defrosting image data stored as JPEG data, color processing, resolution conversion processing, and the like.

Next, in step 504, the file name of the image data displayed on the data display unit 180 is read.

Then, in step 505, the data reading unit 12 reads an AUTOPRINT.MRK file from among files recorded in the information recording medium 11. The contents of the read file are sequentially transferred to the data processing unit 170 to be analyzed. In step 506, the end of the file is confirmed. When the end of the file has been confirmed, the process proceeds to step 511. The operation starting from step 511 will be described later.

When the end of the file is not confirmed, the contents of the file are continued to be analyzed, and in step 507, it is determined if TAG"<IMG" is present. If the result of the determination in step 507 is negative, the process returns to step 506, where the analysis of the contents of the file is continued while confirming the end of the file. If the result of the determination in step 507 is affirmative, the process proceeds to step 508, where the name of the image file to be subjected to image reproduction "XXX.JGP" is read from the contents of the file SRC="XXX.JPG"> recorded after the TAG"<IMG".

In step 509, it is determined if the name of the read image file to be subjected to image reproduction coincides with the name of the image data file currently being displayed. If the result of the determination in step 509 is negative, the process returns to step 506, where the analysis of the contents of the file is continued while confirming the end of the file. If the result of the determination in step 509 is affirmative, the process proceeds to step 510, where a reproduction mark indicating that the image currently being displayed represents image data to be subjected to reproduction output (printing) is provided. FIGS. 24(a)-24(c) illustrate examples of display on the display unit 180 in the seventh embodiment. In FIGS. 24(b) and 24(c), a mark "P" shown at a lower right portion of each frame indicates that the corresponding image is an image to be reproduced. Each of FIGS. 24(a) and 24(c) also illustrates an example of a summary.

Then, the process proceeds to step 511, where it is determined if a displayed-image changing button has been depressed. If the result of the determination in step 511 is affirmative, the process proceeds to step 512, where the next image data is read from the information recording medium. Then, the process returns to step 502, where image display processing is performed, and the above-described processes are again performed in accordance with the flow.

If the result of the determination in step 511 is negative, the process proceeds to step 513, where it is determined if the image-to-be-displayed confirmation end button has been depressed. If the result of the determination in step 513 is affirmative, the operation of confirming the image to be reproduced is terminated, and the process proceeds to step 315. If the result of the determination in step 513 is negative, the process returns to step 511, where it is determined if the displayed-image changing button has been depressed, and the above-described processes are repeated.

In step 315, it is determined if an image is to be reproduced. This determination is provided using a switch of the user interface. If the result of the determination in step 315 is affirmative, the process proceeds to step 303, where image reproduction is performed. If the result of the determination in step 315 is negative, the system terminates the operation.

Next, a description will be provided of the case of proceeding to step 303 and performing image reproduction.

In step 303, the data reading unit 12 reads an AUTOPRINT.MRK file from among files recorded in the information recording medium 11. The contents of the read file are sequentially transferred to the data processing unit 170 to be analyzed. In step 304, the end of the file is confirmed. When the end of the file is not confirmed, the contents of the file are continued to be analyzed, and in step 305, it is determined if TAG"<IMG" is present. If the result of the determination in step 305 is negative, the process returns to step 304, where the analysis of the contents of the file is continued while confirming the end of the file. If the result of the determination in step 305 is affirmative, the process proceeds to step 306, where the name of the image file to be subjected to image reproduction "XXX.JGP" is read from the contents of the file SRC="XXX.JPG" recorded after the TAG"<IMG".

In step 307, image data stored in the image file to be subjected to image reproduction is read based on the read name of the image file to be subjected to image reproduction. In step 308, the image reproduction processing unit 14 executes image reproduction output processing for image reproduction output (printing), to generate image reproduction output data. The generated image reproduction output data is subjected to reproduction output (printing) by the image reproducing unit 13.

In the seventh embodiment, JPEG data is used as image data, and the data reproducing unit 13 uses an ink-jet printer as the image reproducing device. Accordingly, the image reproduction processing unit 14 performs processing of obtaining RGB data by defrosting image data stored as JPEG data, color processing, resolution conversion processing, halftoning processing, and the like.

When image reproduction output (printing) has been performed, the process returns to step 304, where the system continues the analysis of the contents of the AUTOPRINT.MRK file while confirming the end of the file.

Until the end of the file is confirmed, the analysis of the contents is performed by executing the processes of steps 304, 305, 306, 307, 308 and 309.

When the end of the file has been confirmed in step 304, the system terminates its operation.

As described above, in the image reproduction system of the seventh embodiment, desired image data is automatically selected from the information recording medium where the data is recorded according to the image filing method of the seventh embodiment, and image reproduction output is performed. Accordingly, as described in the seventh embodiment, by executing the image filing method and the image reproducing method of the present invention, desired image data recorded in the information recording medium can be automatically reproduced and output without assigning the desired image using a memo or the like.

Furthermore, since means for confirming an image to be reproduced is provided, it is possible to easily confirm the image to be reproduced by the user's instruction before automatically performing image reproduction.

Although in the seventh embodiment, JPEG data is used as image data and image data for display, image data is not limited to JPEG data. For example, data conforming to TIFF, PICT or the like may also be used. RAW data may also be used. In this case, however, it is necessary to record information relating to image reproduction in the information recording medium together with image data. When using data having a format other than the JPEG format, it is only necessary to change processing performed by the image reproduction processing unit 14 and the data processing unit 170 shown in the seventh embodiment depending on each image data. The present invention is not limited to a specific type of image data being used.

Although in the seventh embodiment, an ink-jet printer is used as the image reproducing device, the present invention is not limited to such a printer. For example, a sublimation-type thermal printer or a silver-halide-film printer may be used. Although a CRT is used as the data display device, the present invention is not limited to such a device. For example, an LCD, a plasma display, an LED display, or any other printer may be used. When using such a device, also, it is only necessary to change processing in the image reproduction processing unit 14 and the data processing unit 170 shown in the seventh embodiment so as to perform processing corresponding to a printer or a soft copy display device being used. Accordingly, the present invention may use any appropriate image reproducing device and data display device.

In the image reproduction system of the present invention, by analyzing recorded data at a corresponding position based on the position and the size of image-reproduction instruction data in a file, and determining how the contents of the data correspond to predetermined contents of recording, it is determined whether or not image data recorded in the file is to be reproduced. Accordingly, it is only necessary that image data and image-reproduction instruction data for instructing whether or not the image data is to be reproduced are recorded in the file. There is no limitation in the position, the size, the contents, the order and the like of recording.

Eighth Embodiment

As methods for confirming an image to be reproduced, a method of displaying a summary of images to be displayed, and a method of individually displaying image data recorded in an information recording medium and displaying, when the concerned image is an image to be displayed, a mark indicating that fact together with the image data have been described in detail.

As another method for confirming an image to be reproduced, there is a method of displaying a summary of image data recorded in an information recording medium, and displaying, when the concerned image data represents an image to be reproduced, that fact for each image in the summary.

FIG. 24(*c*) illustrates an example of the above-described method according to an eighth embodiment of the present invention. A summary of image data recorded in the information recording medium is displayed on the display unit. In the eighth embodiment, a thumbnail image is used as the displayed image. A mark "P" is simultaneously displayed at a lower right portion of the thumbnail image when the image is to be displayed. The method of indicating an image to be displayed is not limited to such a method. For example, a method of changing the hue of an image to be reproduced from the hue for other images, or a method of providing a frame for an image to be reproduced may be adopted.

Procedures for actually executing the eighth embodiment in an image output system and apparatus can be obtained by correcting procedures for executing the above-described two methods. Hence, further description thereof will be omitted.

Ninth Embodiment

A ninth embodiment of the present invention will now be described.

An object of the present invention is to easily confirm an image to be reproduced in an apparatus for automatically reproducing an image represented by image data recorded in an information recording medium. For that purpose, an image-reproduction instruction data file for specifying image data subjected to image reproduction is provided, and means for grasping the contents of the file before performing image reproduction is provided.

By utilizing this function, it is possible to perform warning for an operational error or the like produced in automatic printing when the number of printable images is smaller than the number of images to be printed.

A description will now be provided of such processing according to the ninth embodiment.

Figure 21:
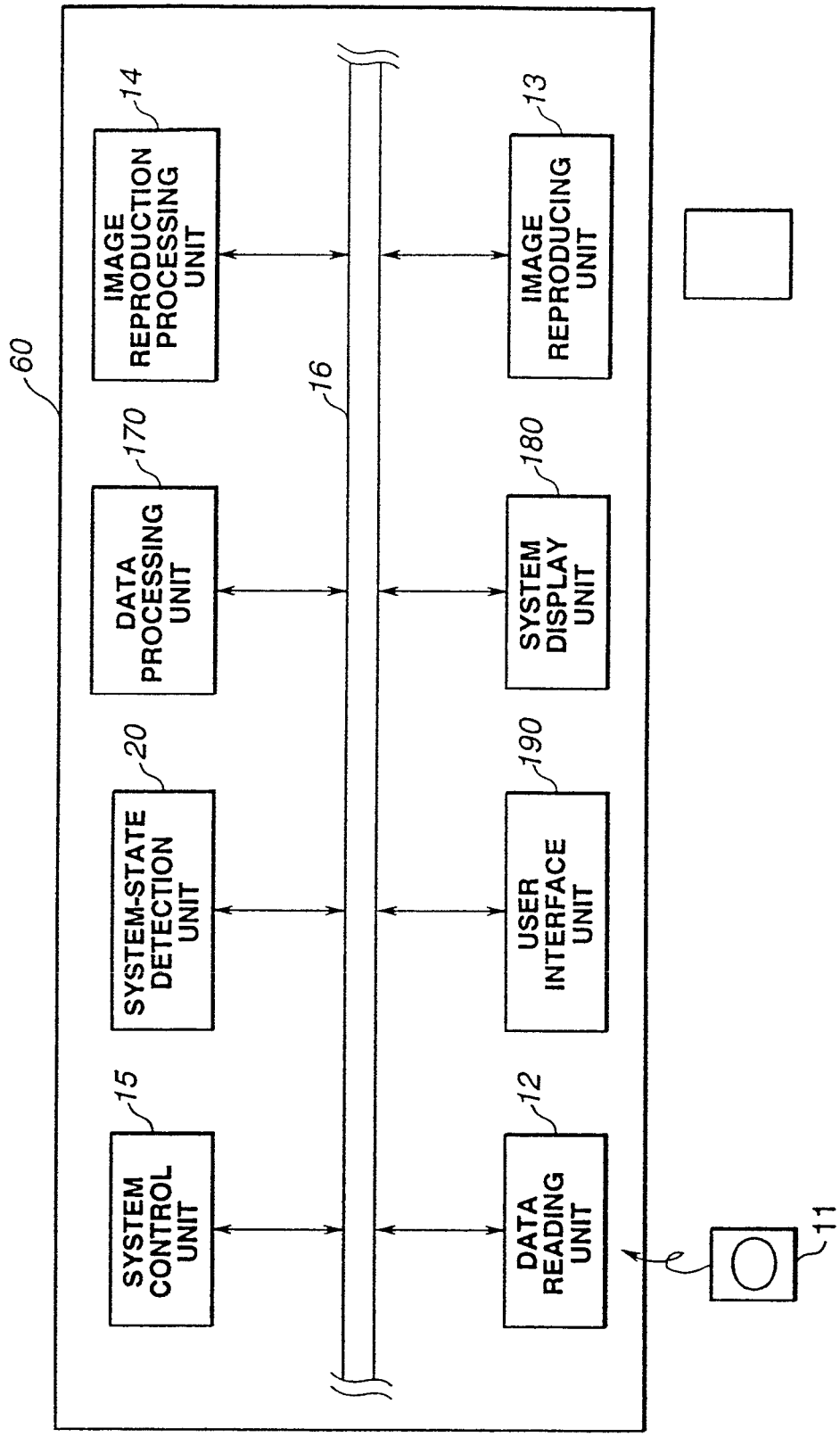
FIG. 21 is a diagram illustrating an image reproduction system (apparatus) for performing image reproduction according to a ninth embodiment of the present invention.

FIG. 21 is a diagram illustrating an image reproduction system (apparatus) 60 for executing an image reproduction method according to the ninth embodiment.

This image reproduction apparatus (system) 60 automatically selects a desired image from among images recorded in an information recording medium 11, and performs reproduction output (printing) of the selected image. At that time, the apparatus 60 checks the number of prints outputtable from the apparatus and the number of images to be automatically output. If the number of images to be output exceeds the number of outputtable prints, the apparatus 60 displays a warning to suspend image output and to prevent occurrence of an output error.

For that purpose, the apparatus 60 provides a system-state detection unit 20 in contrast to the apparatuses of the foregoing embodiments. In the system (apparatus) 60 of the ninth embodiment, an ink-jet printer is used as an image reproducing device of an image reproducing unit 13. The number of prints suppliable from the ink-jet printer is given based on the total amount of inks of respective colors to be supplied and the number of printing sheets. Accordingly, in the ninth embodiment, the system-state detection unit 20 includes a device for optically monitoring the capacity of ink tanks of the ink-jet printer, and a device for monitoring the number of sheets from the thickness of the sheets. It is thereby possible to always detect the current number of prints outputtable from the ink-jet printer. This approach may also be applied to a laser-beam printer or other printers. Other components in the ninth embodiment are the same as in the foregoing embodiments.

Next, a description will be provided of the operation of the image reproduction system 60 of the ninth embodiment.

Figure 22:
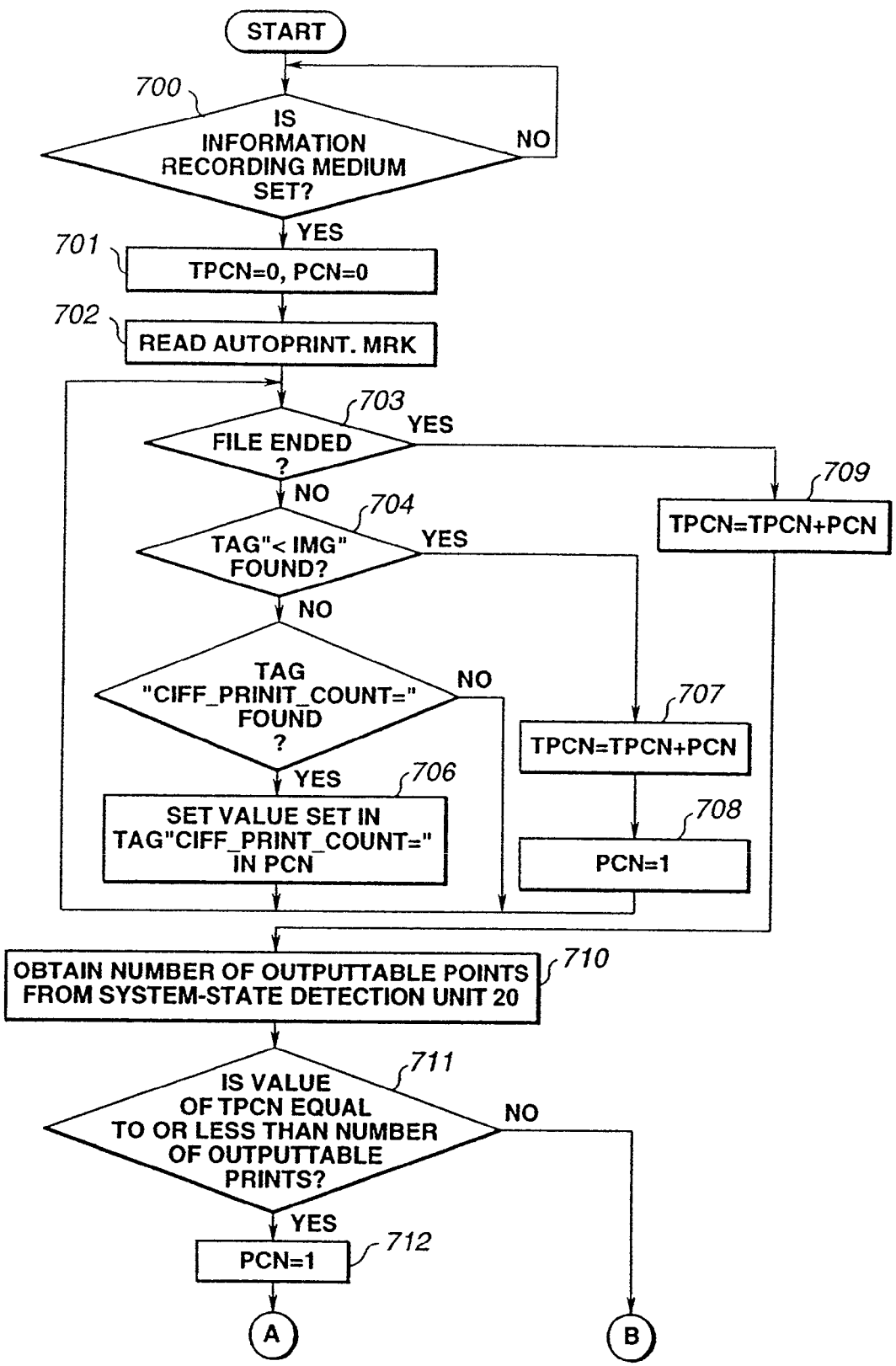
FIGS. 22 and 23 are flowcharts illustrating the operation of an image reproduction system according to an eighth embodiment of the present invention.
Figure 23:
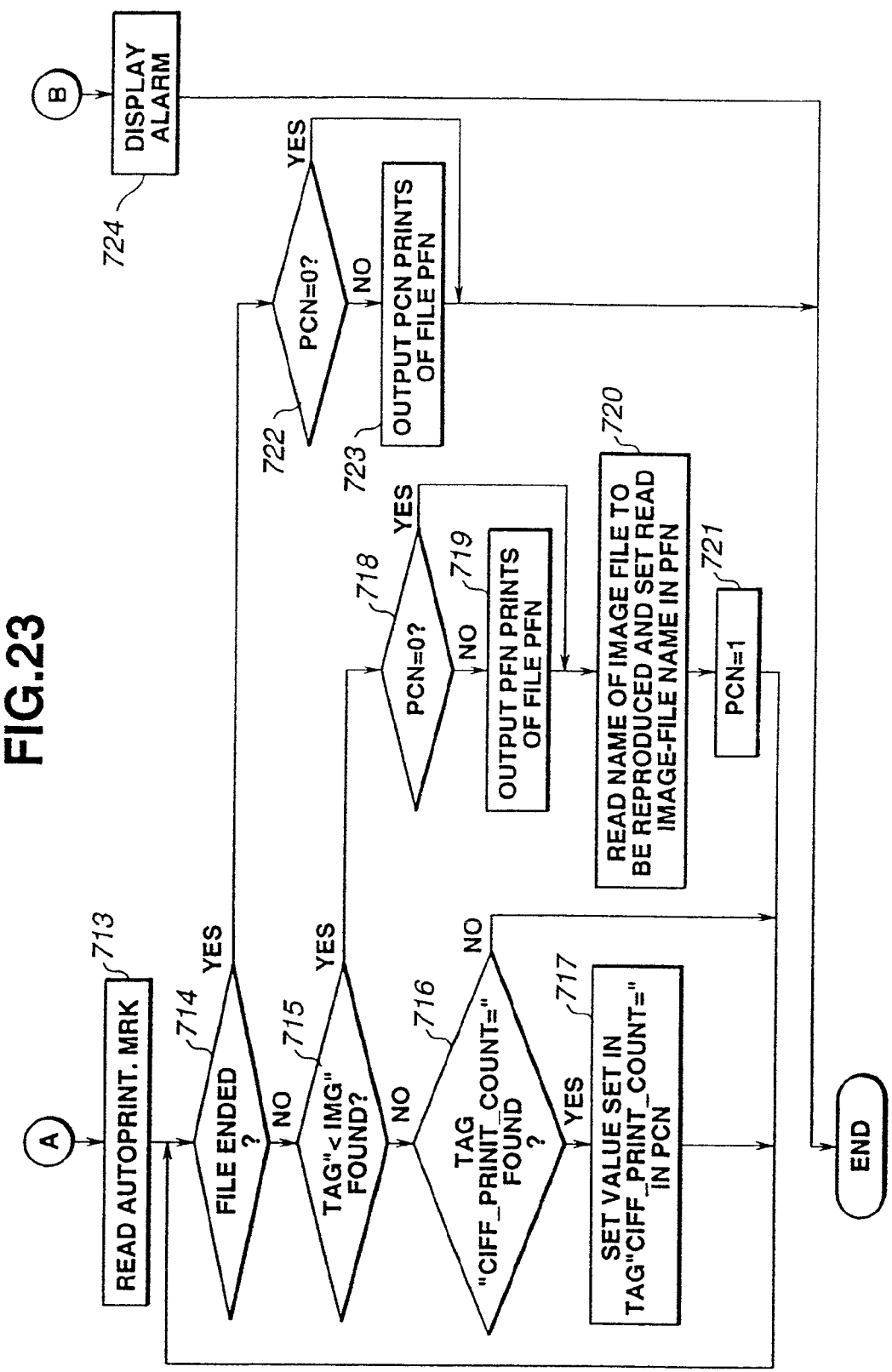

FIGS. 22 and 23 illustrate the operational flow of the image reproduction system 60 of the ninth embodiment. The operational flow is set in a RAM, a hard disk or the like of the system control unit 15 of the image reproduction system 60.

When the image reproduction system 60 has started, for example, by turning on the power supply, the operational flow is read and executed.

First, in step 700, it is determined if an information recording medium 11 is set in a data reading unit 12. If the result of the determination in step 700 is affirmative, the process proceeds to step 701, where initial setting is performed, i.e., a value 0 is set in a counter TPCN for setting the total number of prints, and a value 0 is set in a counter PCN for setting the number of prints for each image. The process then proceeds to step 702, where the data reading unit 12 reads an AUTO-PRINT.MRK file from among files recorded in the information recording medium 11. The contents of the read file are sequentially transferred to a data processing unit 170 to be analyzed.

In step 703, the end of the file is determined. If the result of the determination in step 703 is affirmative, the process proceeds to step 709, where the value of the counter PCN is added to the value of the counter TPCN. The value of the counter TPCN obtained at that time is the total number of image reproduction operations (prints).

If the result of the determination in step 703 is negative, the contents of the file are continued to be analyzed, and in step 704, it is determined if TAG"<IMG" is present. If the result of the determination in step 704 is affirmative, the process proceeds to step 707, where the value currently held by the counter PCN is added to the value of the counter TPCN. The process then proceeds to step 708, where the value of the counter PCN is set to 1. The process then returns to step 703, and the analysis of the contents of the file is continued.

If the result of the determination in step 704 is negative, the process proceeds to step 705, where it is determined if TAG"CIFF_PRINT_COUNT=" is present in the contents of the file. If the result of the determination in step 705 is negative, the process returns to step 703, and analysis of the contents of the file is continued.

If the result of the determination in step 705 is affirmative, a value "X" set in TAG"CIFF_PRINT_COUNT=" in the form of CIFF_PRINT_COUNT="X" is set in the counter PCN. The process then returns to step 703, and the analysis of the contents of the file is continued.

Step 710 is executed after step 709. In step 710, the number of prints outputtable from the apparatus (system) is read from the system-state detection unit 20. Then, in step 711, it is determined if the value of the counter TPCN obtained in step 709 is equal to or less than the outputtable prints read in step 710. If the result of the determination in step 711 is negative, the process proceeds to step 724, where warning display is performed on a data display unit 180, and the operation of the system is terminated. If the result of the determination in step 711 is affirmative, the process proceeds to step 712, where image reproduction output (printing) is performed.

Next, a description will be provided of the case of proceeding to step 712 and performing image reproduction.

In step 712, initial setting is performed, and a value 0 is set in the counter PCN for setting the number of prints for each image.

Then, in step 713, the data reading unit 12 reads an AUTO-PRINT.MRK file from among files recorded in the information recording medium 11. The contents of the read file are sequentially transferred to the data processing unit 170 to be analyzed. In step 714, the end of the file is confirmed.

When the end of the file has been confirmed, the process proceeds to step 722, where it is determined if the value of the counter PCN is 0. If the result of the determination in step 722 is affirmative, the system terminates its operation. If the result of the determination in step 722 is negative, the process proceeds to step 723, where about PCN prints of image data corresponding to the file name recorded in a file-name temporarily storing folder PFN are output, and the operation of the system is terminated.

When the end of the file is not confirmed, the contents of the file are continued to be analyzed, and in step 715, it is determined if TAG"<IMG" is present.

If the result of the determination in step 715 is negative, the process proceeds to step 716, where it is determined if TAG"CIFF_PRINT_COUNT=" is present. If the result of the determination in step 716 is affirmative, a value "X" given in the form of CIFF_PRINT_COUNT=X is set in the counter PCN. The process then returns to step 714, and the analysis of the contents of the file is continued while confirming the end of the file. If the result of the determination in step 715 is affirmative, the process proceeds to step 718, where it is determined if the value of the counter PCN is 0. If the result of the determination in step 718 is affirmative, the process proceeds to step 720. If the result of the determination in step 718 is negative, the process proceeds to step 719, where about PCN prints of image data corresponding to the file name recorded in the file-name temporarily storing folder PFN are output. The process then proceeds to step 720. In step 720, the file name recorded immediately after TAG"<IMG" is read and is set in the file-name temporarily storing folder PFN.

In step 721, a value 1 is set in the counter PCN. The process then returns to step 714, and the analysis of the contents of the file is continued while confirming the end of the file.

In the ninth embodiment, JPEG data is used as image data, and the data reproducing unit 13 uses an ink-jet printer as the image reproducing device. Accordingly, the image reproduction processing unit 14 performs processing of obtaining RGB data by defrosting image data stored as JPEG data, color processing, resolution conversion processing, halftoning processing, and the like.

As described above, in the image reproduction system of the ninth embodiment, desired image data is automatically selected from the information recording medium where the data is recorded according to the image filing method of the ninth embodiment, and image reproduction output is performed. Accordingly, as described in the ninth embodiment, by executing the image filing method and the image reproducing method of the present invention, desired image data recorded in the information recording medium can be automatically reproduced and output without assigning the desired image using a memo or the like.

Furthermore, since means for confirming the total output number of images to be reproduced and the number of prints currently outputtable from the system (apparatus), means for determining if the number of outputtable prints is larger than the total number of output prints, and means for displaying warning in accordance with the result of the determination are provided, the user can easily confirm whether or not an image can be output before automatically performing image reproduction, and it is therefore possible to prevent an output error.

Although in the ninth embodiment, JPEG data is used as image data, image data is not limited to JPEG data. For example, data conforming to TIFF, PICT or the like may also be used. RAW data may also be used. In this case, however, it is necessary to record information relating to image reproduction in the information recording medium together with image data. When using data having a format other than the JPEG format, it is only necessary to change processing performed by the image reproduction processing unit 14 shown in the ninth embodiment depending on each image data. The present invention is not limited to a specific type of image data being used.

Although in the ninth embodiment, an ink-jet printer is used as the image reproducing device, the present invention is not limited to such a printer. For example, a sublimation-type thermal printer or a silver-halide-film printer may be used. Alternatively, a soft-copy display device, such as a CRT, an LCD, a plasma display or the like, may be used. When using such a device, also, it is only necessary to change processing in the image reproduction processing unit 14 and the system-state detection unit 20 and monitoring means so as to perform processing corresponding to a printer or a soft copy display device being used. Accordingly, the present invention may use any appropriate image reproducing device. For example, in the case of a sublimation-type thermal printer, a sublimation dye is provided in the form of a sheet. Since an area necessary for providing a print and the total area of sheets set in advance in the apparatus are known, it is possible to know the number of prints available from now on by storing the number of prints obtained up to the present.

As described above, an object of the present invention is to easily confirm an image to be reproduced in an apparatus for automatically reproducing an image represented by image data recorded in an information recording medium. For that purpose, an image-reproduction instruction data file for specifying image data to be subjected to image reproduction, and means for grasping the contents of the file before performing image reproduction are provided. It is thereby possible to easily confirm an image to be reproduced, display a summary of images to be displayed on data display means, add a mark indicating an image to be reproduced to an image displayed on the data display means, compare the number of outputtable prints with the total number of output prints, perform warning display when the number of outputtable prints is insufficient, and thereby prevent an output error.

Accordingly, the present invention is not limited to the procedures, the apparatuses and the configurations shown in the foregoing embodiments, but can be executed in various other procedures, algorithms, apparatuses and configurations within the scope of the gist of the present invention.

Next, a description will be provided of further improvements in the present invention.

Tenth Embodiment

A method for editing data recorded in an information recording medium according to a tenth embodiment of the present invention will now be described in detail with reference to the drawings.

The tenth embodiment has a feature in that an output error when image data corresponding to image-reproduction instruction data is absent in the information recording medium. Means for accessing image data to be reproduced is provided. When image-reproduction instruction data is added to image data to be erased, the image-reproduction instruction data is also erased. When there is no image in the data, a reproduction output operation is skipped.

Figure 25:
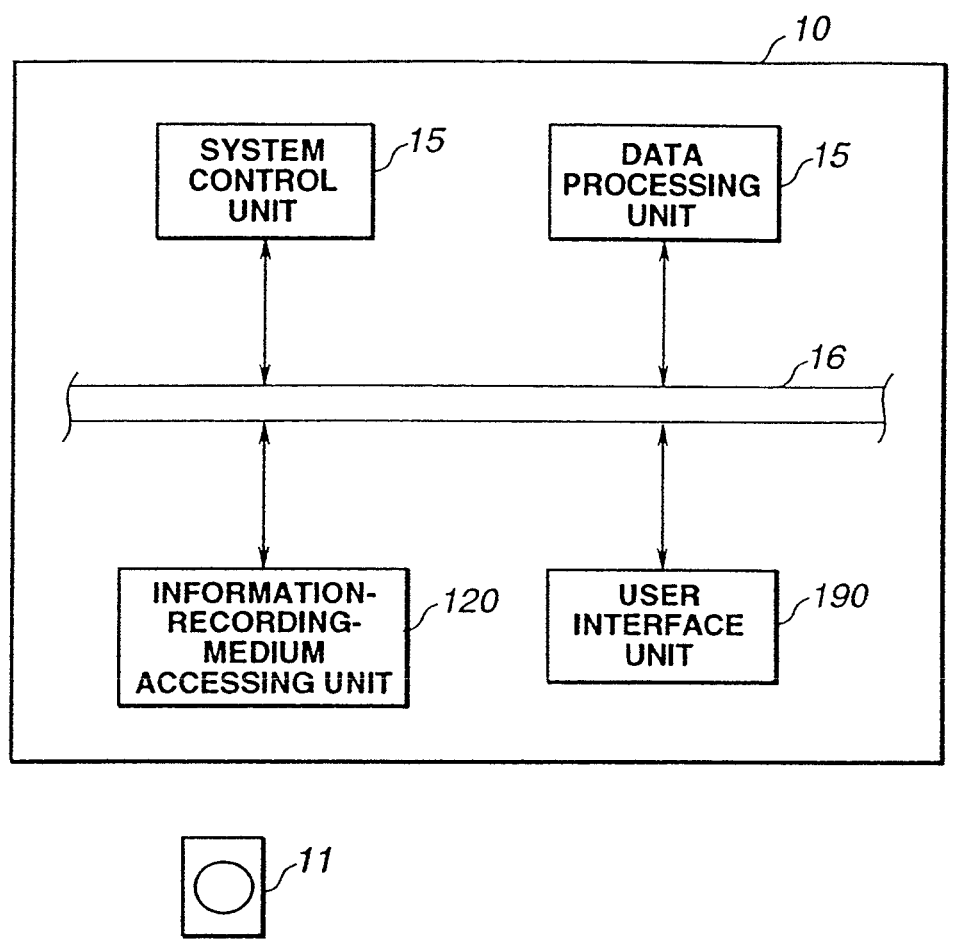
FIG. 25 is a diagram illustrating a system for executing a method for editing information-recording-medium data in a tenth embodiment of the present invention.

FIG. 25 illustrates a system for executing a method for editing data in an information recording medium in the tenth embodiment. This system provides an instruction whether or not image data recorded in an information recording medium 11 is to be deleted, or whether or not image data is to be reproduced, and edits data in the information recording medium 11, by accessing image data and image-reproduction instruction data recorded in the information recording medium 11.

In the tenth embodiment, a CF is used as the information recording medium 11. The information recording medium 11 is not limited to the CF. For example, a floppy disk or the like may also be used.

The information-recording-medium-data editing system 10 includes an information-recording-medium accessing unit 120 for accessing recorded data, comprising image-reproduction instruction data and image data, recorded in the information recording medium 11, and outputting the recorded data to a bus 16 or recording a result of processing in the system in the information recording medium 11, a system control unit 15 for controlling the operations of the entire system by controlling respective units of the information-recording-medium-data editing system 10, a user interface unit 190, having an information-recording-medium-data display unit for reading data recorded in the information recording medium 11 under the control of the system control unit 15 or according to the user's instruction provided at the user interface unit 190, and displaying image data and image-reproduction instruction data obtained via the bus 16, for obtaining image-exchange instruction information, image-data-erasure instruction information and image-reproduction instruction information provided by the user.

The format of the image file shown in FIGS. 17(*a*)-17(*c*) is used as the format of the image file of the tenth embodiment. The contents of recording of 'AUTOPRINT.MRK' shown in FIG. 18 are also used in the tenth embodiment. In the tenth embodiment, such a file is generated by image input means, such as a digital camera or the like, a personal computer, the information-recording-medium-data editing system of the tenth embodiment, or the like.

Figure 26:
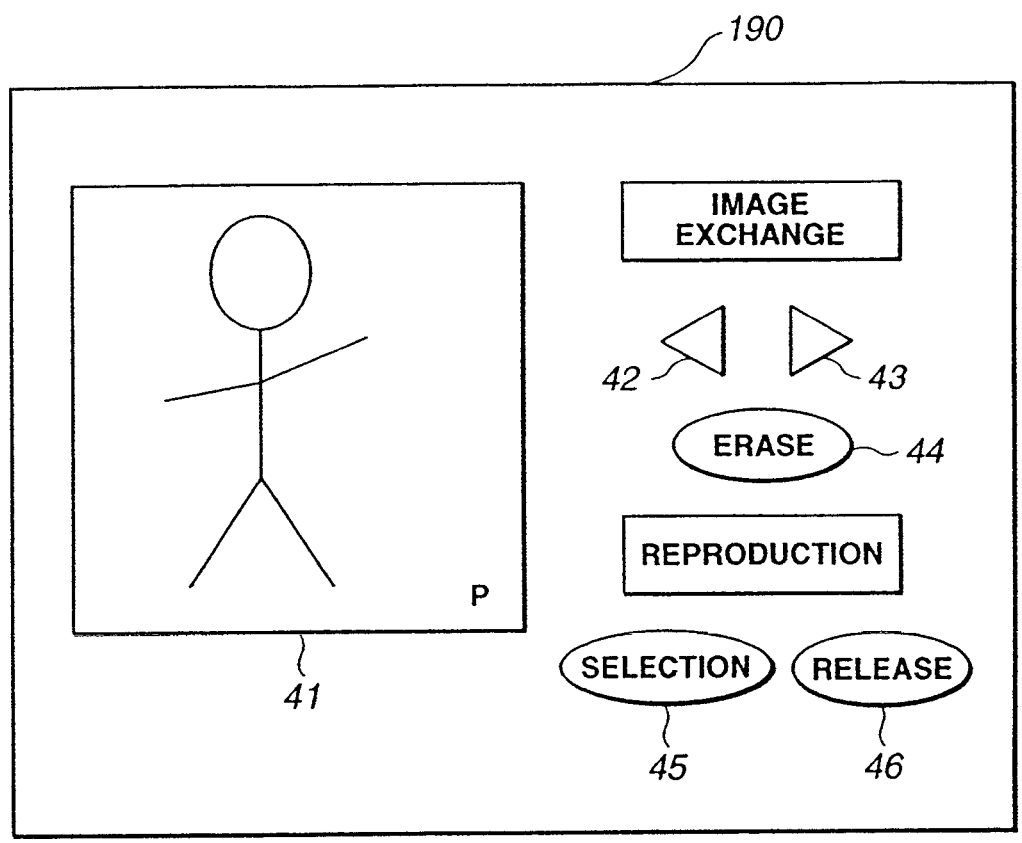
FIG. 26 illustrates a display picture surface of a user interface unit shown in FIG. 25.

FIG. 26 illustrates a display picture surface of the user interface unit 190 of the tenth embodiment. In FIG. 26, reference numeral 41 represents a unit for displaying data of the information recording medium, on which image data and image-reproduction instruction data recorded in the information recording medium 11 are displayed. A mark "P" shown at a lower right portion of the displayed image indicates that this image is to be reproduced. A button 42 is used for exchanging the image. By depressing the button 42, image data recorded immediately before the currently displayed image is displayed in the region 41 in accordance with the sequence of images recorded in the information recording medium 11. A button 43 is also used for exchanging the image. By depressing the button 43, image data recorded immediately after the currently displayed image is displayed in the region 41 in accordance with the sequence of images recorded in the information recording medium 11. A button 44 is used for erasing an image recorded in the information recording medium. By depressing the button 44, image data corresponding to the currently displayed image is erased from the information recording medium 11. A button 45 is used for indicating that the displayed image is to be reproduced (printed). By depressing the button 45, the file name of the currently displayed image data recorded in the information recording medium 11 is read (in the tenth embodiment, this file name is stored in the system control unit 15 as temporarily held data), and is written in an AUTOPRINT.MRK file of the information recording medium 11. When the button 45 is again depressed for image data for which an image-reproduction instruction has already been provided, that operation is neglected. A button 46 is used for instructing that image reproduction (printing) of the displayed image is to be cancelled. By depressing the button 46, the file name of the currently displayed image data recorded in the information recording medium is read (in the tenth embodiment, the file name of the currently displayed image data is held by the system control unit 15 as temporarily held data), and the file name written in the AUTOPRINT.MRK file of the information recording medium 11 is erased. The button 46 is effective only for image data for which an image-reproduction instruction has already been provided. The operation of the button 46 is neglected for other images.

Next, a description will be provided of the operation of the information-recording-medium-data editing system 10 of the tenth embodiment which is a characteristic operation of the present invention. In the tenth embodiment, when an instruction to erase image data is provided from the user interface unit 190, whether or not image reproduction is instructed for the image data is retrieved. If image reproduction is instructed, the image-reproduction instruction is released. That is, whether or not the file name is described in the AUTOPRINT.MRK file is retrieved. If the file name is described, the file name is erased from the AUTOPRINT.MRK file.

Figure 27:
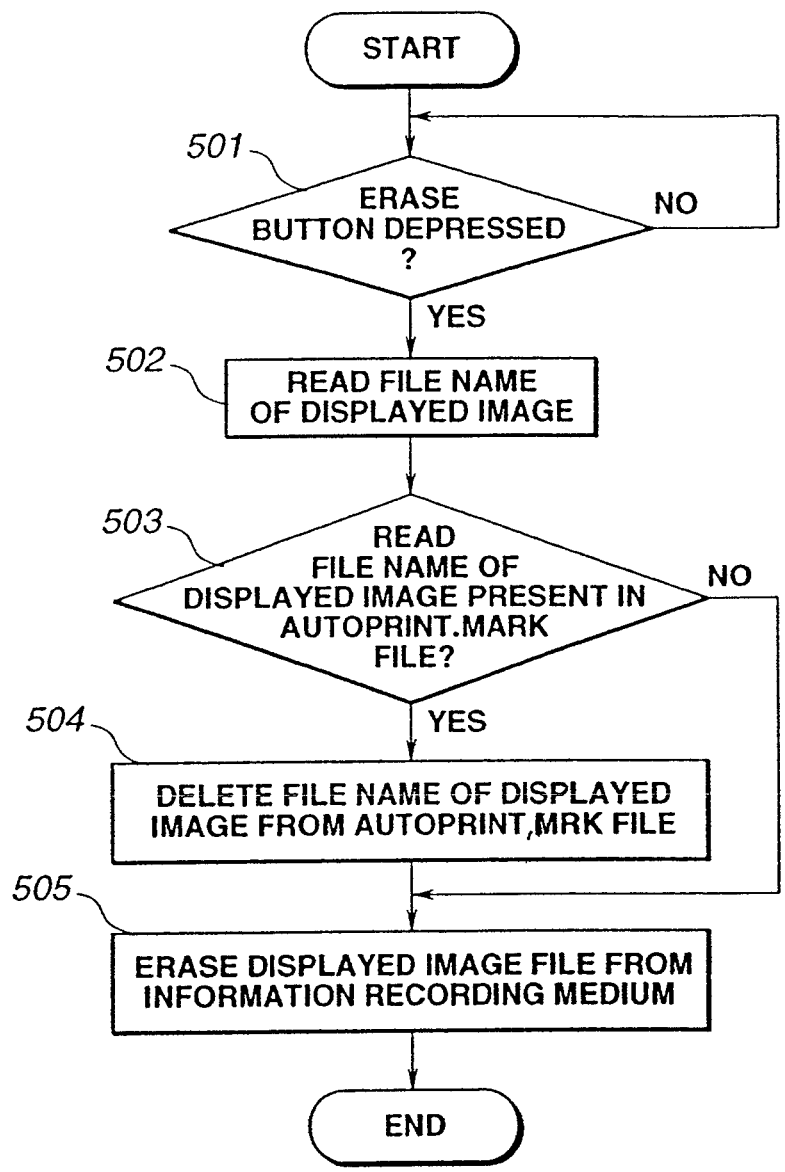
FIG. 27 is a flowchart illustrating the operation of an image reproduction system of the tenth embodiment.

FIG. 27 is a flowchart illustrating the above-described operation of the information-recording-medium-data editing system 10 of the tenth embodiment.

The program represented by this operational flow is set in a RAM, a hard disk or the like of the system control unit 15 of the information-recording-medium-data editing system 10.

When the information-recording-medium-data editing system 10 has started, for example, by turning on the power supply, the operational flow is read and executed.

First, in step 501, it is determined if the erase button has been depressed. This operation actually starts by depressing the erase button. If the result of the determination in step 501 is affirmative, the process proceeds to step 502, where the file name of the currently displayed image data is read, and the contents of the AUTOPRINT.MRK file are analyzed. Then, in step 503, it is determined if the read file name of the displayed image data is present in the AUTOPRINT.MRK file. If the result of the determination in step 503 is affirmative, that file name is deleted from the AUTOPRINT.MRK file, and the file of the displayed image is erased from the information recording medium 11. If the result of the determination in step 503 is negative, the file of the displayed image is erased from the information recording medium 11, because this image is not an image to be displayed and no problem arises during image reproduction output even if the image data is erased.

Although in the tenth embodiment, image data recorded in an information recording medium is individually displayed, and it is determined whether or not the image is to be erased, the present invention is not limited to such an approach.

The gist of the present invention is as follows. That is, image data and data instructing whether or not the image data is to be subjected to reproduction output are recorded in an information recording medium. When editing data of the information recording medium, and erasing image data, it is checked whether or not reproduction of the image data is instructed. If reproduction of the image data is instructed, the reproduction instruction data is released. Accordingly, various means may be considered without departing from the gist of the invention. For example, the present invention can also be executed when a summary of image data is displayed, and an erasing operation is performed by selecting an image using a mouse or the like, or when a file of an information recording medium is directly edited using a file editor or the like.

As described above, according to the present invention, means for erasing image-reproduction instruction data relating to image data based on an instruction to erase the image data is provided, and the image-reproduction instruction data for the image data is also erased when erasing the image data. Accordingly, the problem that image data to be reproduced is absent in an image reproducing operation and the image reproducing operation ends with an error is prevented.

Eleventh Embodiment

An eleventh embodiment of the present invention will now be described. An object of the present invention is to prevent the problem that, when contradiction arises in image data and image-reproduction instruction data recorded in an information recording medium, an image reproducing operation ends with an error. For that purpose, in the above-described tenth embodiment, means for checking image-reproduction instruction data when erasing image data recorded in an information recording medium, and releasing the image-reproduction instruction data when an image-reproduction instruction is provided for the image data to be erased is provided.

In the eleventh embodiment, means for executing an image reproducing operation by neglecting image-reproduction instruction data when image data is absent in an information recording medium although the image-reproduction instruction data is provided is provided. Accordingly, even if contradiction arises in image data and image-reproduction instruction data recorded in an information recording medium, for example, even if an actual image is absent although an image-reproduction instruction data is provided, an image reproducing operation is always executed without producing an error.

Figure 28:
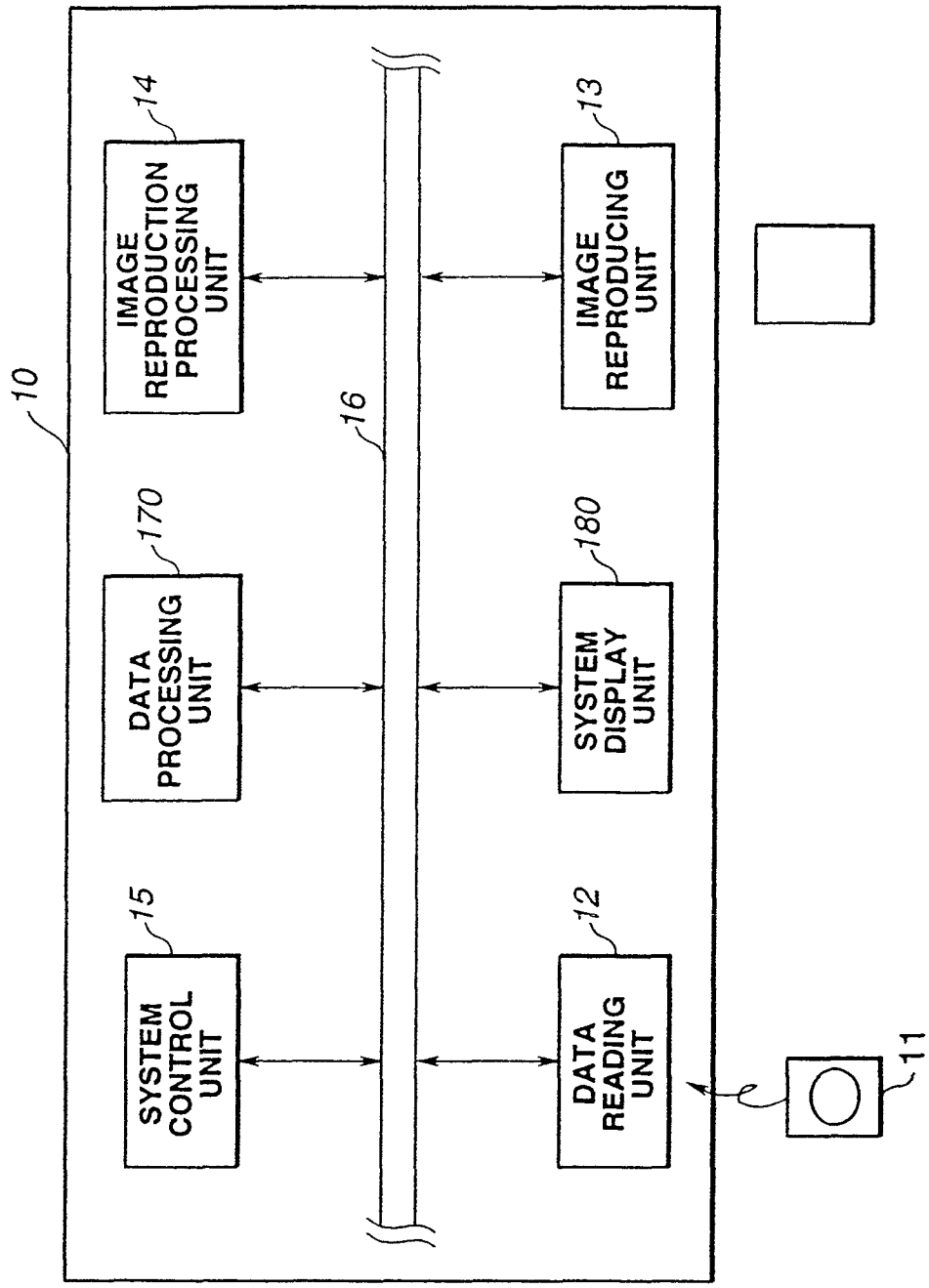
FIG. 28 is a diagram illustrating an image reproduction system (apparatus) for performing image reproduction according to an eleventh embodiment of the present invention.

FIG. 28 illustrates an image reproduction system (apparatus) 10 which executes an image reproduction method according to the eleventh embodiment. This image reproduction apparatus (system) 10 automatically selects desired image data from among image data recorded in an information recording medium 11, and performs reproduction output (printing) of an image represented by the selected image data. In the eleventh embodiment, a CF is used as the information recording medium 11. The information recording medium 11 is not limited to the CF. For example, a floppy disk, a DVD or the like may also be used.

The image reproduction system (apparatus) 10 includes a data reading unit 12 for reading recorded data, comprising image-reproduction instruction data and image data, recorded in the information recording medium 11, and outputting the recorded data to a bus 16, a system control unit 15 for controlling the operations of the entire system by controlling respective units of the image reproduction system 10, an image reproduction processing unit 14 for receiving image data read by the data reading unit 12 under the control of the system control unit 15 and output to the bus 16, and converting the image data into reproduction output data for performing reproduction output and outputting the reproduction output data, an image reproducing unit 13 for receiving the reproduction output data to perform reproduction output (printing), a data processing unit 170 for analyzing the contents of image-reproduction instruction data by selectively accessing that data, and a system display unit 180 for displaying the operational state of the system in accordance with the results of the data processing unit 170 and the system control unit 15.

The format of the image file of the information recording medium in the eleventh embodiment is the same as in the format of the file described in the tenth embodiment. Hence, further description thereof will be omitted. As described above, by checking the contents of recording of AUTOPRINT.MRK, the file of image data to be subjected to image reproduction can be obtained. Furthermore, by checking the root directory, the name of the file recorded in the information recording medium can be obtained. The contents of the information recording medium are edited using input means of a personal computer, a digital camera or the like.

Next, a description will be provided of the operation of the image reproduction system (apparatus) 10 of the eleventh embodiment, which is a feature of the present invention.

Figure 29:
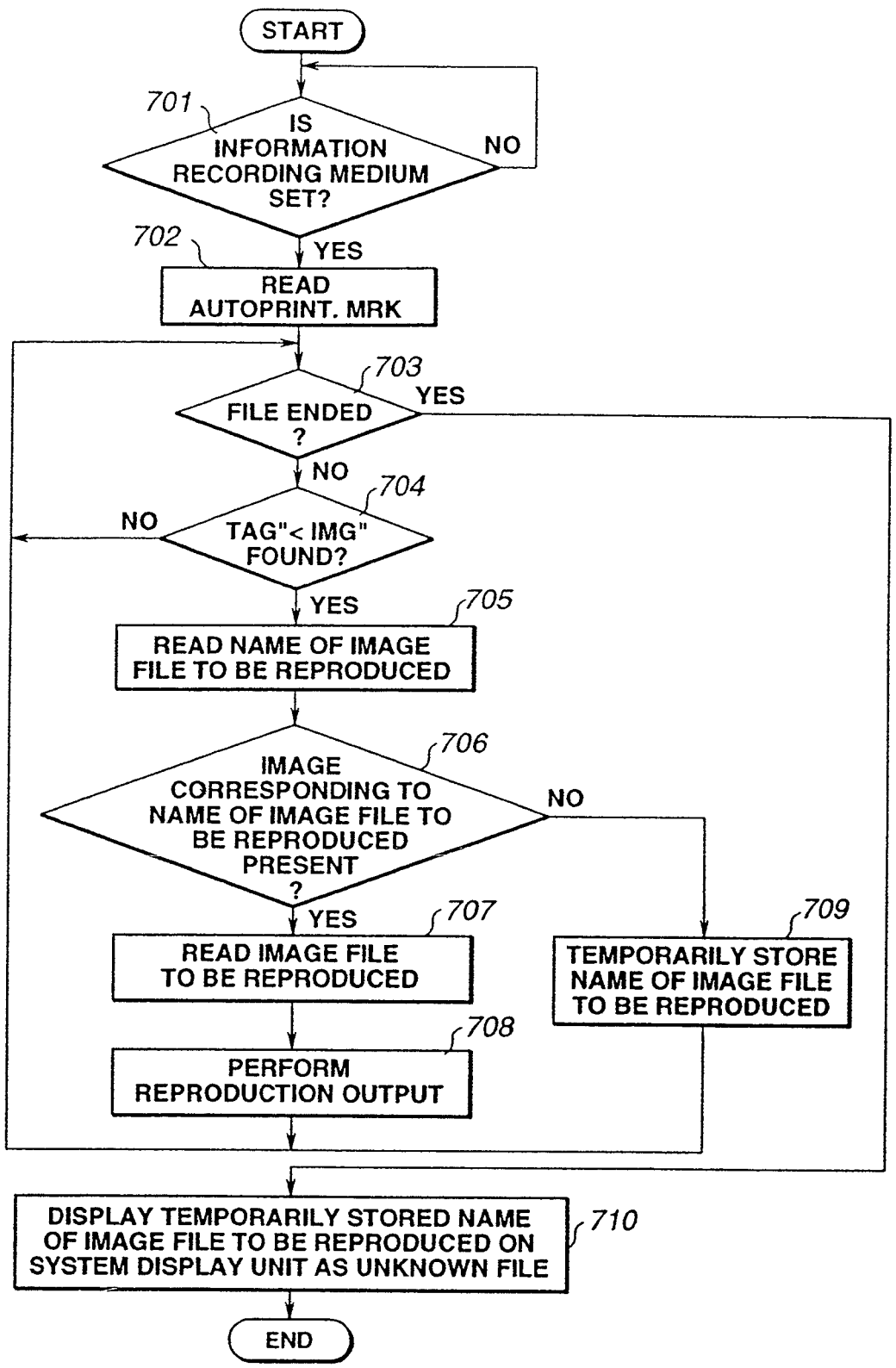
FIG. 29 is a flowchart illustrating the operation of an image reproduction system according to the eleventh embodiment.

FIG. 29 illustrates the operational flow of the image reproduction system 10 of the eleventh embodiment. The program represented by the operational flow is set in a RAM, a hard disk or the like of the system control unit 15 of the image reproduction system 10.

When the image reproduction system 10 has started, for example, by turning on the power supply, the operational flow is read and executed.

First, in step 701, it is determined if the information recording medium 11 is set in the data reading unit 12. If the result of the determination in step 701 is affirmative, the process proceeds to step 702, where the data reading unit 12 reads an AUTOPRINT.MRK file from among files recorded in the information recording medium 11. The contents of the read file are sequentially transferred to the data processing unit 65 to be analyzed. In step 703, the end of the file is confirmed. When the end of the file is not confirmed, the contents of the file are continued to be analyzed, and in step 704, it is determined if TAG"<IMG" is present. If the result of the determination in step 704 is negative, the process returns to step 703, where the analysis of the contents of the file is continued while confirming the end of the file. If the result of the determination in step 704 is affirmative, the process proceeds to step 705, where the name of the image file to be subjected to image reproduction "XXX.JGP" is read from the contents of the file SRC="XXX.JPG"> recorded after the TAG"<IMG".

In step 706, it is determined if a file corresponding to the read name of the image file to be subjected to image reproduction is present in the information recording medium 11. If the result of the determination in step 706 is affirmative, the process proceeds to step 707, where image data to be reproduced stored in the information recording medium 11 is read. Then, in step 708, the image reproduction processing unit 14 executes image reproduction output processing for image reproduction output (printing) to generate image reproduction output data, which is subjected to reproduction output (printing) by the image reproducing unit 13. If the result of the determination in step 706 is negative, the process proceeds to step 709, where the name of the image file to be subjected to image reproduction is temporarily stored in a storage region. At that time, the image reproduction output operation is skipped, and the operation of the system returns to step 703.

In the eleventh embodiment, JPEG data is used as image data for display, and the data reproducing unit 180 uses an ink-jet printer as the image reproducing device. Accordingly, the image reproduction processing unit 140 performs processing of obtaining RGB data by defrosting image data stored as JPEG data, color processing, resolution conversion processing, halftoning processing, and the like.

When image reproduction output (printing) has been performed, the process returns to step 703, where the system continues the analysis of the contents of the AUTOPRINT.MRK file while confirming the end of the file.

Until the end of the file is confirmed, the analysis of the contents of the AUTOPRINT.MRK file is performed by executing the processes of steps 704, 705, 706, 707, 708 and 709.

When the end of the file has been confirmed in step 703, the process proceeds to step 71, where the system displays the file name temporarily stored in the storage region on the system display unit 15 as an unknown file, and terminates the operation.

As described above, in the image reproduction system of the eleventh embodiment, desired image data is automatically selected from the information recording medium where the data is recorded according to the image filing method of the eleventh embodiment, and image reproduction output is performed. Accordingly, as described in the eleventh embodiment, by executing the image filing method and the image reproducing method of the present invention, desired image data recorded in the information recording medium can be automatically reproduced and output without assigning the desired image using a memo or the like.

Furthermore, it is possible to execute an image reproducing operation by neglecting image-reproduction instruction data when image data is absent in an information recording medium although the image-reproduction instruction data is provided. Hence, even if contradiction arises in image data and image-reproduction instruction data recorded in an information recording medium, for example, even if an actual image is absent although an image-reproduction instruction is provided, an image reproducing operation is always executed without producing an error.

Although in the eleventh embodiment, JPEG data is used as image data and image data for display, image data is not limited to JPEG data. For example, data conforming to TIFF, PICT or the like may also be used. RAW data may also be used. In this case, however, it is necessary to record information relating to image reproduction in the information recording medium together with image data. When using data having a format other than the JPEG format, it is only necessary to change processing performed by the image reproduction processing unit 14 and the data processing unit 170 shown in the eleventh embodiment depending on each image data. The present invention is not limited to a specific type of image data being used.

Although in the eleventh embodiment, an ink-jet printer is used as the image reproducing device, the present invention is not limited to such a printer. For example, a sublimation-type thermal printer or a silver-halide-film printer may be used. Although a CRT is used as the data display device, the present invention is not limited to such a device. For example, an LCD, a plasma display, an LED display, or any other printer may be used. When using such a device, also, it is only necessary to change processing in the image reproduction processing unit 14 and the data processing unit 170 shown in the eleventh embodiment so as to perform processing corresponding to a printer or a soft copy display device being used. Accordingly, the present invention may use any appropriate image reproducing device and data display device.

In the image reproduction system of the present invention, by analizing recorded data at a corresponding position based on the position and the size of image-reproduction instruction data in a file, and determining how the contents of the data correspond to predetermined contents of recording, it is determined whether or not image data recorded in the file is to be reproduced. Accordingly, it is only necessary that image data and image-reproduction instruction data for instructing whether or not the image data is to be reproduced are recorded in the file. There is no limitation in the position, the size, the contents, the order and the like of recording.

An object of the present invention is to provide a configuration in which, even when corresponding image data is absent in an information recording medium although image-reproduction instruction data is provided, an image reproducing operation can be executed by neglecting the image-reproduction instruction data. Such a configuration is not limited to the configuration of the eleventh embodiment, but any other appropriate configuration may be adopted within a range of not departing from the object. For example, although in the eleventh embodiment, an unknown file is displayed at the final stage, this step may be omitted in consideration of the object of the present invention.

As described above, by allowing to supply the image reproduction system with an image output control program from an information recording medium or to execute the program by directly accessing the information recording medium, the image reproduction system of the present invention can control image output by an image output control program corresponding to each recording format even for an information recording medium in which data are recorded in a plurality of different recording formats. Hence, it is possible to easily control image output requested by the invention for all formats.

Furthermore, since an image format and an output control program corresponding thereto are provided from the same information recording medium, the system of the invention can automatically set an operation corresponding to the image format recorded in the information recording medium. Hence, the present invention can be easily executed because it is unnecessary to set an operational program in accordance with an information recording medium.

Example of Application

Figure 30:
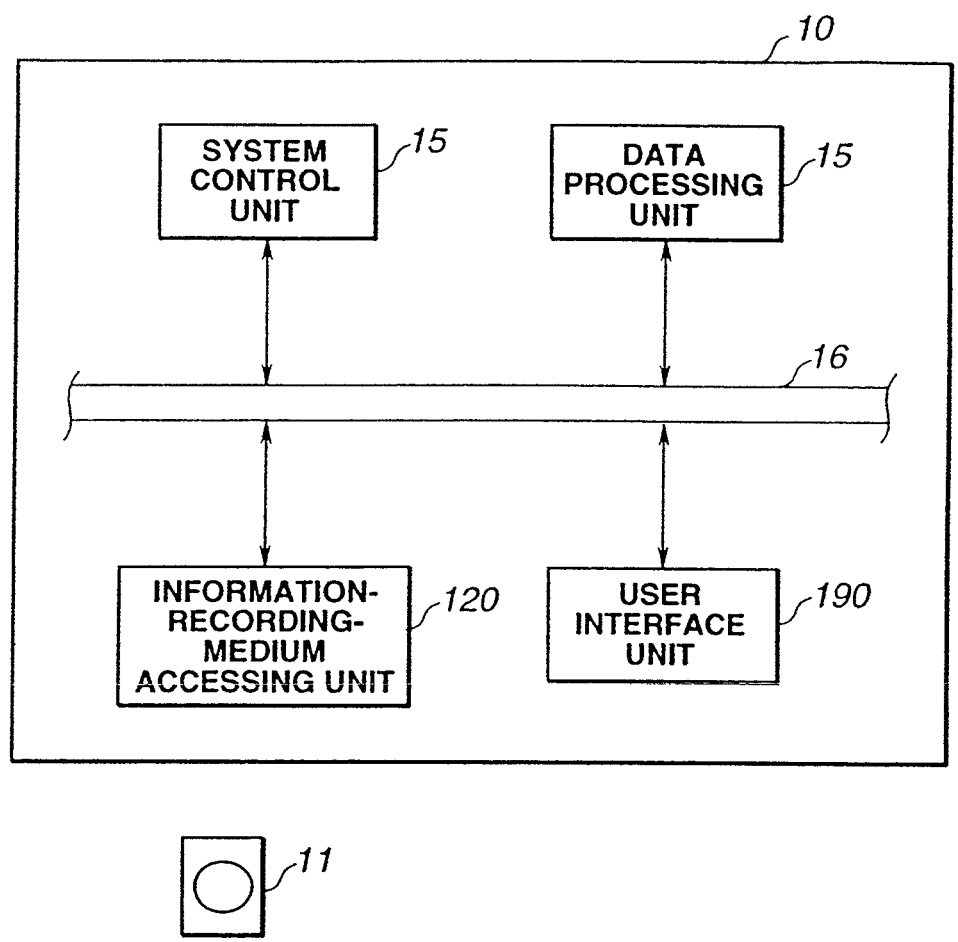
FIG. 30 is a diagram illustrating a system for executing a method for editing transferred data according to an example of application of the present invention.

When image data recorded in one of the above-described formats is transferred from a digital camera, a personal computer or the like via one of various kinds of interfaces or via an Internet or the like, the situation after reception of the data is equal to the case of setting of a medium, as described in the foregoing embodiments, although some kind of certification is required when an instruction of output is recognized in the apparatus 10, i.e., when, for example, accounting is performed. Accordingly, after the apparatus has recognized 'data reception' including certification or the like, control similar to the control performed in any one of the above-described embodiments is performed depending on the situation. FIG. 30 is a diagram illustrating a system for performing such a control. As in the case of FIG. 25, an information recording medium 11 includes a general-purpose interface. Although detailed description will be omitted, it is possible to determine data reception by determining whether or not data obtained via a network, IrDA (Infrared Date Association) interface, a 1394 interface (described, for example, in Japanese Patent Application No. 09-030541 (1997), a parallel interface, a serial interface or the like is based on the above-described format, for example, by checking the presence of respective regions shown in FIGS. 1(*a*)-1(*c*). If this determination is performed instead of step 300 shown in FIG. 3, and the process then proceeds to step 301 and succeeding steps, this application may be applied to each of the above-described embodiments.

As described above, according to the present invention, it is possible to provide a method and apparatus for automatically reproducing desired image data from among image data recorded in an information recording medium using an image filing method in which image data and image-reproduction instruction data indicating whether or not the image data is to be reproduced are recorded in an information recording medium, and an image reproducing method including data reading means for reading recorded data, such as image data, image-reproduction instruction data and the like, recorded in an information recording medium, means for selectively reading the image-reproduction instruction data from among the recorded data, reproduction-output-data generation processing means for reading necessary image data from the information recording medium in accordance with the image-reproduction instruction data and for outputting reproduction output data for reproduction, and reproducing means for reproducing the reproduction output data.

Accordingly, the present invention can be executed in various procedures, algorithms, configurations of apparatuses within the above-described gist of the invention without being limited to the procedures and the configurations of apparatuses shown in the foregoing embodiments The present invention can provide an image filing method and an image reproduction method in which a print of a desired image can be promptly obtained by automatically specifying the image from among images recorded in an information recording medium.

The present invention can provide a file format in which image data and image-reproduction instruction data instructing whether or not the image data is to be reproduced can be recorded in an information recording medium.

According to the present invention, it is possible to provide an apparatus including data reading means for reading recorded data, such as image data, image-reproduction instruction data and the like, recorded in an information recording medium, means for selectively reading the image-reproduction instruction data from among the recorded data, reproduction-output-data generation processing means for reading necessary image data from the information recording medium in accordance with the image-reproduction instruction data and for outputting reproduction output data for reproduction, and reproduction means for reproducing the reproduction output data.

According to the present invention, it is possible to provide an output control method in which image data and image-reproduction instruction data for instructing whether or not the image data is to be reproduced are recorded in an information recording medium, image-reproduction instruction data is selectively read from among recorded data recorded in the information recording medium, necessary image data is read from the information recording medium in accordance with the image-reproduction instruction data, and reproduction-output-data generating processing is performed to reproduce desired image data.

According to a further improvement in the present invention, a method, an apparatus and a system in which image data and image-reproduction instruction data for instructing whether or not the image data is to be reproduced are recorded in an information recording medium, image-reproduction instruction data is selectively read from among recorded data recorded in the information recording medium, necessary image data is read from the information recording medium in accordance with the image-reproduction instruction data, and reproduction-output-data generating processing is performed to reproduce desired image data can perform reproduction output by automatically specifying a desired image from among images recorded in the information recording medium. Hence, it is possible to promptly obtain a print of a desired image without requiring the operator's manual operation.

According to a further improvement in the present invention, it is possible to prevent an error in an image reproducing operation produced because image data to be reproduced is absent, for example, when image data recorded in an information recording medium for which image-reproduction instruction data has been provided in order to perform image reproduction is deleted and processing of non-selection is not performed for the image-reproduction instruction data. Hence, when performing automatic image reproduction, automatic image reproduction can be efficiently executed by preventing abnormal end of an image reproducing operation.

According the present invention, it is possible to provide a memory medium for storing image data and image-reproduction instruction data for instructing whether or not the image data is to be reproduced so that the image-reproduction instruction data specifies an image for which image reproduction is instructed, and that the specified image data can be selectively output based on the image-reproduction instruction data.

The memory medium can also store a program for controlling reproduction of the image data based on the image-reproduction instruction data. The image-reproduction instruction data is stored for each image data. The image-reproduction instruction data is provided for the name of each image data. The image-reproduction instruction data comprises information for instructing image data to be reproduced stored in a specific file.

According to the present invention, it is possible to provide an image output control method including a function of recognizing mounting of a recording medium, a reading function of reading image-reproduction instruction data recorded in the recording medium based on the recognition of the mounting, and a generation function of performing image generation for output by selectively reading necessary image data from the information recording medium in accordance with the image-reproduction instruction data.

According to the present invention, it is possible to provide an image output control apparatus including recognition means for recognizing mounting of a recording medium, reading means for reading image-reproduction instruction data recorded in the recording medium based on the recognition of the mounting, and generation means for performing image generation for output by selectively reading necessary image data from the information recording medium in accordance with the image-reproduction instruction data.

According to the present invention, it is possible to provide an output control method including a determination function of determining mounting of a medium, a discrimination function of discriminating whether or not an image output program is stored in the medium when the determination function has determined that the medium is mounted, and a control function of controlling output so as to selectively output an image to be output in accordance with the image output program when the discrimination function has discriminated that the image output program is stored.

The control function may have a function of determining whether or not image-reproduction instruction data is stored in the medium. When it has been determined that image-reproduction instruction data is stored, the control function controls output so as to selectively output image data instructed by the image-reproduction instruction data. The control function may also include a function of reading the image output program when the discrimination function has discriminated that the image output program is stored.

According to the present invention, it is possible to provide an output control apparatus including determination means for determining mounting of a medium, discrimination means for discriminating whether or not an image output program is stored in the medium when the determination means has determined that the medium is mounted, and control means for controlling output so as to selectively output an image to be output in accordance with the image output program when the discrimination means has discriminated that the image output program is stored. The control means may have a function of determining whether or not image-reproduction instruction data is stored in the medium. If the result of the determination is affirmative, the control means controls output so as to selectively output image data instructed by the image-reproduction instruction data. The apparatus may further include control means for controlling output of the image to be output in accordance with an output program incorporated within the apparatus when the discrimination means has discriminated that the image output program is not stored in the medium. The control means may include a function of determining whether or not the image-reproduction instruction data is stored in the medium. When the result of the determination is affirmative, the control means controls output so as to selectively output image data instructed by the image-reproduction instruction data based on the output program incorporated within the apparatus.

According to the present invention, it is possible to provide an output control method including a determination function of determining whether or not a medium storing an image output program is set, and a control function of controlling output so as to output an image to be selectively output in accordance with the image output program if the result of the determination is affirmative.

The determination function may also have a function of determining whether or not a medium storing image data is set. The determination function may determine whether or not the medium storing the image output program and a medium storing image data are set. The determination function may have a function of determining whether or not image data and image-reproduction instruction data are stored. When it has been determined that these data are stored, the control function controls output so as to selectively output image data instructed by the image-reproduction instruction data. The control function may include a function of reading the image output program when the determination function has determined that the image output program is stored. The determination function may determine setting of a medium, setting of the medium storing the image output program, and setting of a medium storing image data.

According to the present invention, it is possible to provide an output control apparatus including determination means for determining whether or not a medium storing an image output program is set, and control means for controlling output so as to selectively output an image to be output in accordance with the image output program if the result of the determination is affirmative.

The determination function may also have a function of determining whether or not a medium storing image data is set. The determination function may determine whether or not the medium storing the image output program and a medium storing image data are set. The determination function may have a function of determining whether or not image data and image-reproduction instruction data are stored. When it has been determined that these data are stored, the control means controls output so as to selectively output image data instructed by the image-reproduction instruction data. The control means may include a function of reading the image output program when the determination means has determined that the image output program is stored. The determination means may determine setting of a medium, setting of the medium storing the image output program, and setting of a medium storing image data.

In the image output control method, a program for controlling reproduction of the image data based on the image-reproduction instruction data may be stored in the medium. The image-reproduction instruction data may be stored for each image data. The image-reproduction instruction data may be provided for the name of each image data. The image-reproduction instruction data may comprise information for instructing image data to be reproduced stored in a specific file.

In the image output control apparatus, a program for controlling reproduction of the image data based on the image-reproduction instruction data may be stored in the medium. The image-reproduction instruction data may be stored for each image data. The image-reproduction instruction data may be provided for the name of each image data. The image-reproduction instruction data may comprise information for instructing image data to be reproduced stored in a specific file.

The output may be executed by one of hard copy output apparatuses, such as an ink-jet printer, a sublimation-type thermal printer, a silver-halide-film printer, and the like.

The output may be executed by a soft-copy output apparatus, such as a cathode-ray tube, a liquid-crystal display, a plasma display or the like.

According to the present invention, it is possible to provide a storage medium including a function of recognizing mounting of a recording medium, a reading function of reading image-reproduction instruction data recorded in the recording medium based on the recognition of the mounting, and generation function of performing image generation for output by selectively reading necessary image data from the information recording medium in accordance with the image-reproduction instruction data.

According to the present invention, it is possible to provide a storage medium including a determination function of determining mounting of a medium, a discrimination function of discriminating whether or not an image output program is stored in the medium when the determination function has determined that the medium is mounted, and a control function of controlling output so as to selectively output an image to be output in accordance with the image output program when the discrimination function has discriminated that the image output program is stored.

According to the present invention, it is possible to provide a storage medium including a determination function of determining whether or not a medium storing an image output program is set, and a control function of controlling output so as to selectively output an image to be output in accordance with the image output program if the result of the determination is affirmative.

According to the present invention, it is possible to provide an image output control apparatus including recognition means for recognizing mounting of a recording medium which stores image data and image-reproduction instruction data for instructing whether or not the image data is to be reproduced so that the image-reproduction instruction data specifies an image for which image reproduction is instructed, and that the specified image data can be selectively output based on the image-reproduction instruction data, reading means for reading the image-reproduction instruction data recorded in the recording medium based on the recognition of the mounting of the recording medium by the recognition means, and generation means for performing image generation for output by selectively reading necessary image data from the information recording medium in accordance with the image-reproduction instruction data.

A program for controlling reproduction of the image data based on the image-reproduction instruction data may be stored in the recording medium. The image-reproduction instruction data may be stored for each image data. The image-reproduction instruction data may be provided for the name of each image data. The image-reproduction instruction data may comprise information for instructing image data to be reproduced stored in a specific file.

According to the present invention, it is possible to provide an image output control apparatus including recognition means for recognizing reception of image data and image-reproduction instruction data in a format so that the image data can be selectively output in an output device based on the image-reproduction instruction data, reading control means for reading the image-reproduction instruction data based on the recognition of reception of the image data and the image-reproduction instruction data by the recognition means, and generation control means for selectively performing image generation for output for necessary image data from among the image data in accordance with the image-reproduction instruction data.

The image-reproduction instruction data may be stored for each image data. The image-reproduction instruction data may be provided for the name of each image data. The image-reproduction instruction data may comprise information for instructing image data to be reproduced stored in a specific file. The recognition means may recognize reception of the image-reproduction instruction data and the image data.

According to the present invention, it is possible to provide an image output control apparatus including data reading means for reading recorded data including image data and image-output instruction data recorded in an information recording medium, output-data generation processing means for outputting output data for output by reading necessary image data from the information recording medium in accordance with the image-output instruction data, output means for outputting the output data, data display means for displaying image-output instruction data and image data, and data processing means for analyzing the image-output instruction data.

The data display means may display a summary of data for specifying an image to be output. The data display means may display data for specifying image data recorded in the information recording media, and information indicating whether or not an instruction for outputting the displayed image data is present.

According to the present invention, it is possible to provide an image output control apparatus including data reading means for reading recorded data including image data and image-output instruction data recorded in an information recording medium, output-data generation processing means for outputting output data for output by reading necessary image data from the information recording medium in accordance with the image-output instruction data, output means for outputting the output data, data display means for displaying data relating to image output, data processing means for analyzing the image-output instruction data, and means for recognizing a number of prints currently outputtable by the apparatus.

The data display means may compare the total number of output prints obtained by the data processing means with the number of currently outputtable prints obtained by the means for recognizing the number of currently outputtable prints, and performs alarm display when the number of prints to be output is larger than the number of outputtable prints.

According to the present invention, it is possible to provide an image output control apparatus including means for accessing an information recording medium, data reading means for reading recorded data including image data and image-output instruction data recorded in the information recording medium, and determination means for determining whether or not data to instruct erasure of image data in the recorded data is present. If the determination means has determined that the erasure instruction data is present, image-output instruction data corresponding to that image data is erased based on the erasure instruction data.

The apparatus may further include data editing means for editing data of the information recording medium.

According to the present invention, it is possible to provide an image output control apparatus including reading means for reading image-reproduction instruction data for instructing whether or not image data is to be reproduced recorded in an information recording medium storing the image data and the image-reproduction instruction data so that the image-reproduction instruction data specifies an image for which image reproduction is instructed, and that the specified image data can be selectively output based on the image-reproduction instruction data, generation means for performing image reproduction for output by reading necessary image data from the information recording medium in accordance with the read image-reproduction instruction data, and skip means for skipping an operation of outputting an image corresponding to image data for which the image-reproduction instruction data is provided when that image data is absent in the information recording medium.

The apparatus may further include result-of-operation display means for displaying a result of an operation of the apparatus. When an output operation has been skipped, that fact is displayed using the result-of-operation display means.

According to the present invention, it is possible to provide an image input control apparatus including input control means for inputting image data, and recording control means for recording image data corresponding to image-reproduction instruction data for instructing whether or not image data is to be reproduced, based on a format provided so that image-reproduction instruction data specifies image data for which image reproduction is instructed.

The image-reproduction instruction data and the image data may be recorded in an information recording medium.

The individual components shown in outline or designated by blocks in the drawings are all well-known in the image output control apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display apparatus comprising:
a display for displaying images;
an access unit constructed to access a detachable memory, the detachable memory storing a plurality of image files and a print instruction file, the print instruction file including file names for specifying image files to be printed by a printer;
a reading unit constructed to read the plurality of image files and the print instruction file from the detachable memory;
a display control unit constructed to display a summary of a plurality of images corresponding to the image files read by the reading unit from the detachable memory, on the display according to the print instruction file;
an analyzing unit constructed to analyze the print instruction file read by the reading unit and to specify the image files to be printed by the printer;
a user interface unit constructed to select an image file from the plurality of image files stored in the detachable memory, and to give or cancel an instruction to print the selected image file; and
a processing unit constructed to manage the information in the print instruction file stored in the detachable memory,
wherein when displaying the summary of the plurality of the images corresponding to the image files recorded in the detachable memory, the display control unit determines whether file names of the images being displayed are included in the print instruction file recorded in the detachable memory, displays images corresponding to the image files whose file names are included in the print instruction file with marks indicating images to be printed, and displays images corresponding to image files whose file names are not included in the print instruction file without adding marks,
wherein the images with added marks and the images without added marks are displayed together as the summary of the plurality of images,
wherein the user interface unit allows giving of the print instruction or cancelling of the print instruction in accordance with displaying a specified image with an added mark, and
wherein in a case where the user interface unit gives the print instruction, the processing unit adds the file name of the image file which is specified to be printed into the print instruction file, and in a case where the user interface unit cancels the print instruction, the processing unit deletes the file name of the image file of which the print instruction is cancelled from the print instruction file, so that the user may give the print instruction or cancel the print instruction in accordance with confirming, by the print instruction file, whether or not an image has been specified to be printed.

2. The display apparatus according to claim 1, further comprising an operating unit constructed to switch the plurality of images to be displayed on the display from one to another.

3. The display apparatus according to claim 2, wherein the display control unit switches the plurality of images to be displayed on the display from one to another in response to an operation by the operating unit, following the order of the file names included in the print instruction file stored in the detachable memory.

4. A control method of controlling a display, the method comprising:

reading, from a detachable memory storing a plurality of image files and a print instruction file including file names for specifying image files to be printed by a printer, the plurality of image files and the print instruction file; and controlling display of a summary of a plurality of images corresponding to the image files read by the reading step from the detachable memory, on a display according to the print instruction file;

analyzing the print instruction file read by the reading step, and then specifying the image files to be printed by the printer;

providing a user interface for selecting an image file from the plurality of image files stored in the detachable memory, and for giving or cancelling an instruction to print the selected image file; and managing the information in the print instruction file stored in the detachable memory, wherein when displaying the summary of the plurality of the images corresponding to the image files recorded in the detachable memory, it is determined whether file names of the images being displayed are included in the print instruction file recorded in the detachable memory, images corresponding to the image files whose file names are included in the print instruction file are displayed with marks indicating images to be printed, and images corresponding to image files whose file names are not included in the print instruction file are displayed without adding marks, wherein the images with added marks and the images without added marks are displayed together as the summary of the plurality of images, wherein the user interface allows giving of the print instruction or cancelling of the print instruction in accordance with displaying a specified image with an added mark, and wherein in a case where the user interface gives the print instruction, the processing unit adds the file name of the image file which is specified to be printed into the print instruction file, and in a case where the user interface cancels the print instruction, the processing unit deletes the file name of the image file of which the print instruction is cancelled from the print instruction file, so that the user may give the print instruction or cancel the print instruction in accordance with confirming, by the print instruction file, whether or not an image has been specified to be printed.

5. The method according to claim 4, wherein the plurality of images to be displayed on the display are switched from one to another in response to an operation by an operating step, following the order of the file names included in the print instruction file stored in the detachable memory.

6. A non-transitory computer-readable storage medium storing a computer-executable program for executing the method according to claim 4.

7. The display apparatus according to claim 1, wherein the print instruction file which is preliminarily recorded in the detachable memory includes file names of a plurality of image files, so as to enable the display control unit to determine the plurality of image files to be displayed with marks by analyzing the print instruction file when displaying the marks.

8. The display apparatus according to claim 1, wherein the display apparatus is a digital camera and the print instruction file is editable when capturing and reproducing the image.

* * * * *